(12) United States Patent
Heo et al.

(10) Patent No.: US 10,620,788 B2
(45) Date of Patent: Apr. 14, 2020

(54) MOBILE TERMINAL AND CONTROL METHOD THEREFOR

(71) Applicant: LG ELECTRONICS INC., Seoul (KR)

(72) Inventors: Jeongyun Heo, Seoul (KR); Sunhee Cheon, Seoul (KR); Goeun Joo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 314 days.

(21) Appl. No.: 15/316,146

(22) PCT Filed: Apr. 27, 2015

(86) PCT No.: PCT/KR2015/004168
§ 371 (c)(1),
(2) Date: Dec. 2, 2016

(87) PCT Pub. No.: WO2015/186908
PCT Pub. Date: Dec. 10, 2015

(65) Prior Publication Data
US 2017/0139557 A1     May 18, 2017

(30) Foreign Application Priority Data
Jun. 3, 2014 (KR) ........................ 10-2014-0067358

(51) Int. Cl.
*G06F 3/0482* (2013.01)
*G06F 3/0488* (2013.01)
(Continued)

(52) U.S. Cl.
CPC .......... *G06F 3/0482* (2013.01); *G06F 3/0485* (2013.01); *G06F 3/0488* (2013.01);
(Continued)

(58) Field of Classification Search
CPC .......... G06F 17/30; G06F 3/048; G06F 15/16; G06F 15/00
See application file for complete search history.

(56) References Cited

U.S. PATENT DOCUMENTS 7,222,299 B1 * 5/2007 Lim ...................... G06F 17/218
715/273
2004/0073616 A1 * 4/2004 Fellenstein .......... G06Q 10/107
709/206

(Continued)

FOREIGN PATENT DOCUMENTS

KR 10-2004-0009121   1/2004
KR 10-2008-0065168   7/2008

(Continued)

OTHER PUBLICATIONS

PCT International Application No. PCT/KR2015/004168, Written Opinion of the International Searching Authority dated Jul. 15, 2015, 12 pages.

*Primary Examiner* — Rashawn N Tillery
(74) *Attorney, Agent, or Firm* — Lee, Hong, Degerman, Kang & Waimey

(57) ABSTRACT

Disclosed are a mobile terminal and a control method therefor, the mobile terminal capable of highlighting information related to a sender or information related to a receiver in the body text of an email. A mobile terminal for this purpose may comprise: a wireless communication unit for sending or receiving an email; a display unit for displaying the sender or receiver of the email and the body text of the email; and a control unit for controlling the terminal so that information related to the sender or information related to the receiver in the body text of the email can be highlighted.

20 Claims, 41 Drawing Sheets

(51) Int. Cl.
*G06F 3/0485* (2013.01)
*G06F 3/0484* (2013.01)
*G06F 3/0481* (2013.01)
*G06F 17/21* (2006.01)
*H04M 1/725* (2006.01)

(52) U.S. Cl.
CPC ...... *G06F 3/04817* (2013.01); *G06F 3/04842* (2013.01); *G06F 3/04845* (2013.01); *G06F 3/04883* (2013.01); *G06F 17/211* (2013.01); *H04M 1/72552* (2013.01); *G06F 2203/04806* (2013.01); *H04M 2250/22* (2013.01)

(56) References Cited

U.S. PATENT DOCUMENTS

| | | | | |
|---|---|---|---|---|
| 2005/0080853 | A1* | 4/2005 | Kelley | G06F 17/30637 709/206 |
| 2009/0006565 | A1* | 1/2009 | Velusamy | G06F 17/211 709/206 |
| 2009/0214034 | A1* | 8/2009 | Mehrotra | G06Q 10/107 380/255 |
| 2011/0119258 | A1* | 5/2011 | Forutanpour | G06Q 10/107 707/723 |
| 2011/0252023 | A1* | 10/2011 | Santamaria | G06Q 10/107 707/723 |
| 2012/0204110 | A1* | 8/2012 | Cabral | G06F 3/0482 715/727 |
| 2012/0289206 | A1* | 11/2012 | Shim | G06Q 10/06 455/414.1 |
| 2013/0006973 | A1* | 1/2013 | Caldwell | G06F 17/30719 707/723 |
| 2013/0036344 | A1* | 2/2013 | Ahmed | G06F 17/30867 715/205 |
| 2014/0280094 | A1* | 9/2014 | Brandstetter | G06F 17/30867 707/723 |
| 2014/0333632 | A1* | 11/2014 | Kim | G06F 3/0486 345/467 |
| 2014/0370938 | A1* | 12/2014 | Lee | H04M 1/72583 455/566 |
| 2016/0241499 | A1* | 8/2016 | Hailpern | G06Q 10/107 |

FOREIGN PATENT DOCUMENTS

| | | |
|---|---|---|
| KR | 10-2011-0026693 | 3/2011 |
| KR | 10-2012-0126843 | 11/2012 |
| KR | 10-20140045452 | 4/2014 |

* cited by examiner

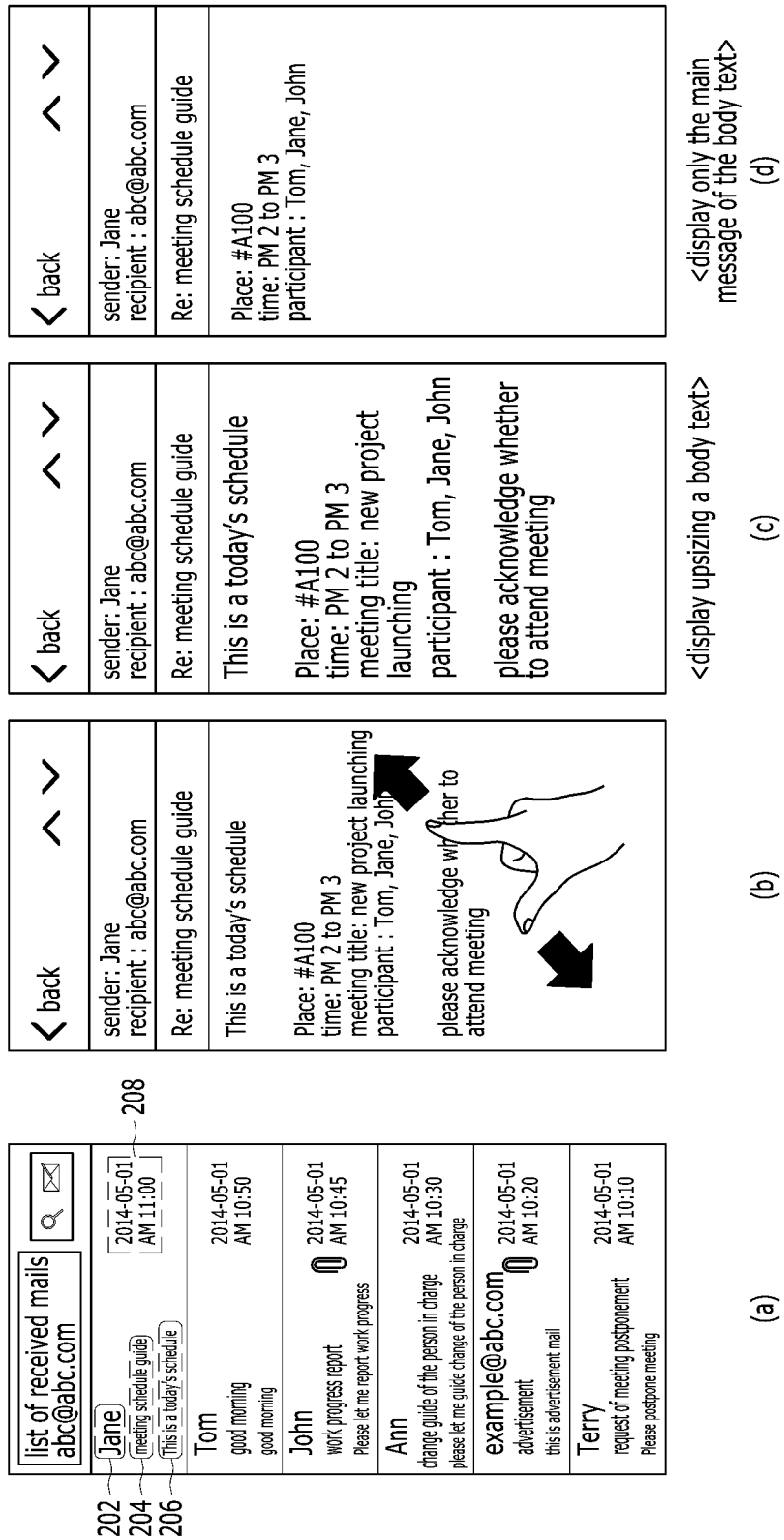

(a)  (b)

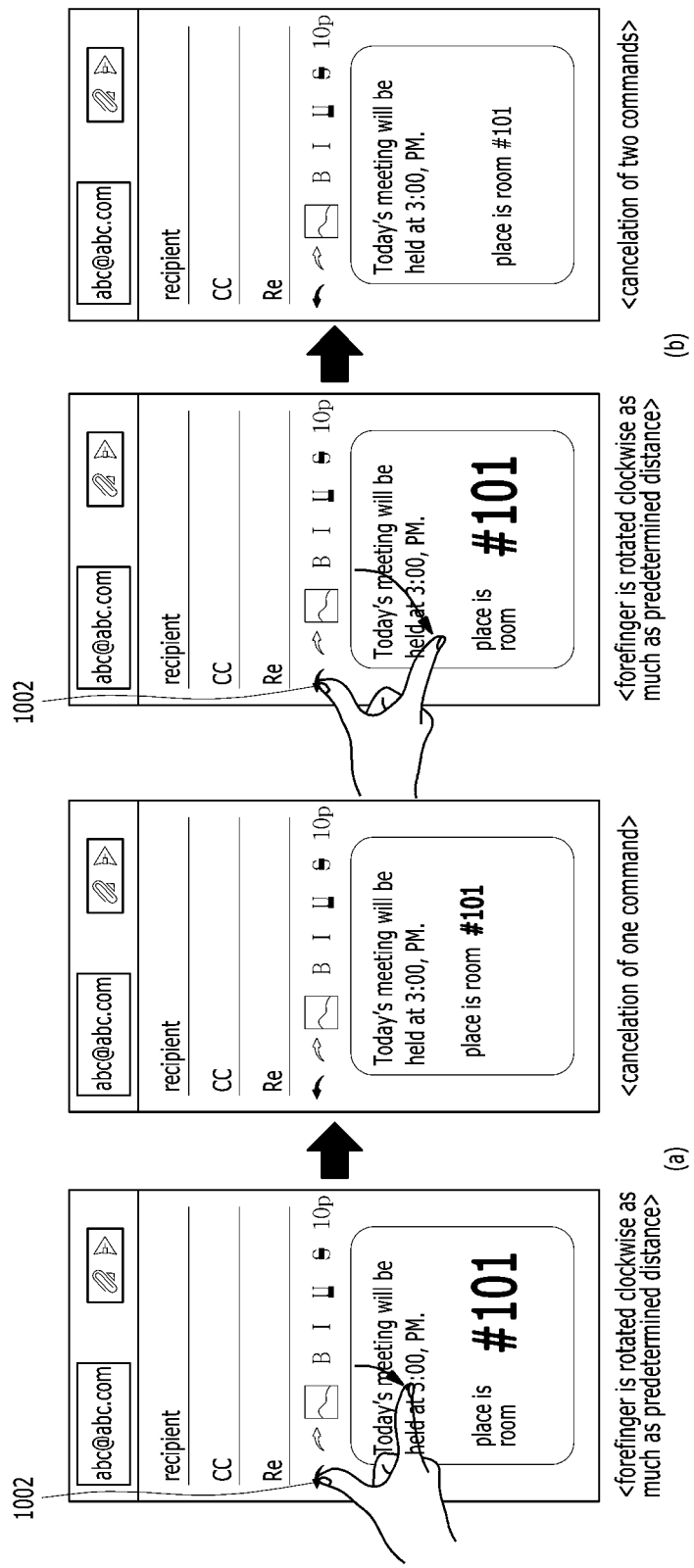

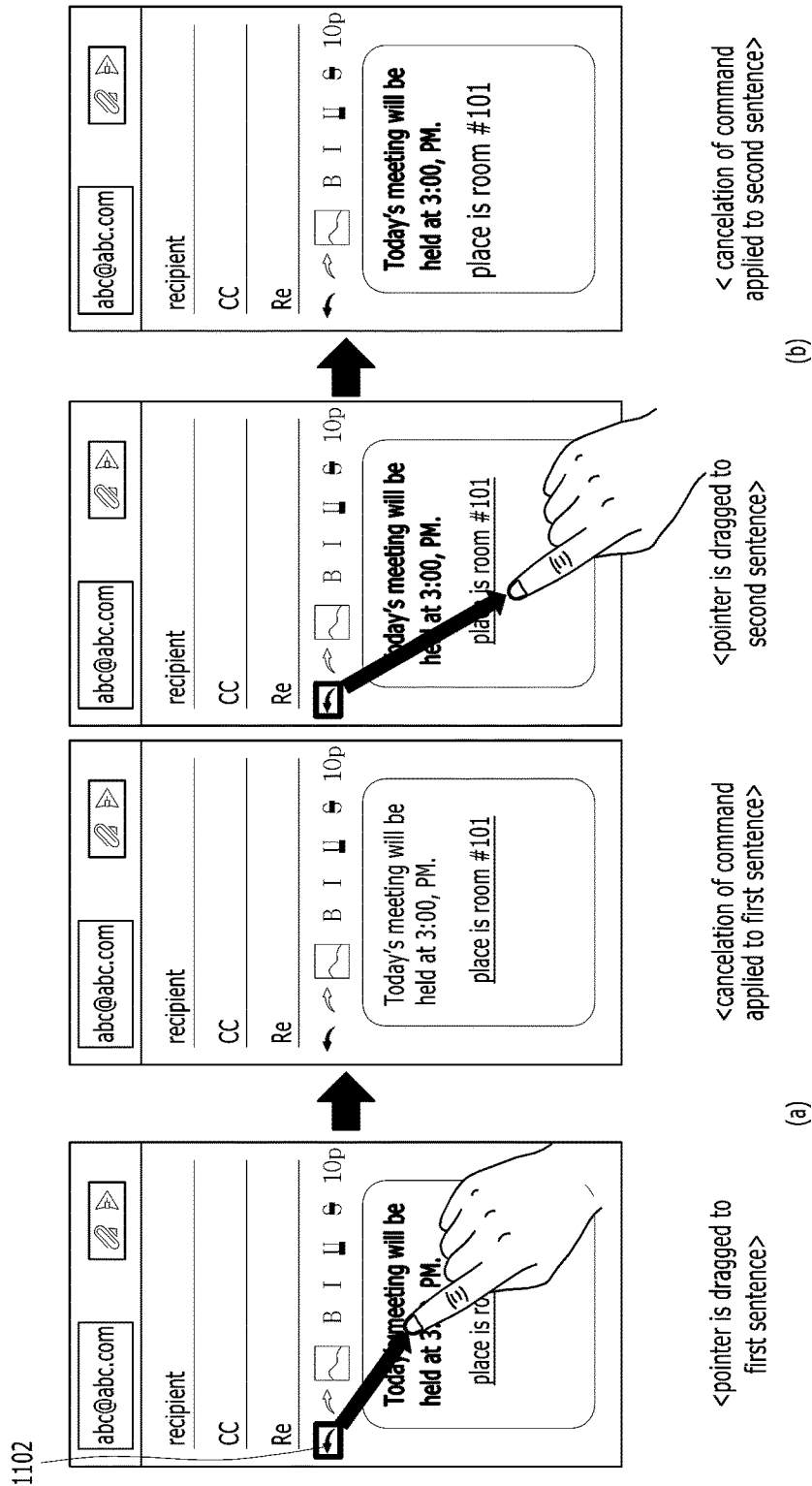

scroll of body area (a)

information related to Jane is searched
from newly displayed content -> feedback
(for example, vibration) output (b)

highlight information related to Jane
(a)

highlight information related to Tom
(b)

MOBILE TERMINAL AND CONTROL METHOD THEREFOR

CROSS-REFERENCE TO RELATED APPLICATIONS

This application is the National Stage filing under 35 U.S.C. 371 of International Application No. PCT/KR2015/004168, filed on Apr. 27, 2015, which claims the benefit of earlier filing date and right of priority to Korean Application No. 10-2014-0067358, filed on Jun. 3, 2014, the contents of which are all hereby incorporated by reference herein in their entirety.

TECHNICAL FIELD

The present invention a mobile terminal capable of highlighting information related to a sender or information related to a recipient in the body text of an email, and a control method therefor.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

With the diversified functions of the mobile terminal, the mobile terminal has been changed to a device that can handle various communication media. For example, a recent mobile terminal may handle various media for communication between users such as phone conversation, text message, instant message, social network service (SNS), and emails.

As emails have been able to be received and transmitted through the mobile terminal, users who use the mobile terminal for work, have been increased, and transmission of emails through the mobile terminal has been increased exponentially. For example, if a user registers information for accessing an email server in the mobile terminal, the mobile terminal may receive an email transmitted to the user from an email server by using the registered information or transmit an email drafted by the user to the email server.

However, since the mobile terminal has a small screen, the user may have a difficulty in checking a bulk email. The user may want to extract a main message only from the bulk email to check the email message. To this end, if the user inputs a search keyword, a function for searching for the input keyword may be implemented. However, the search function has inconvenience in that the user should necessarily input the search keyword. For example, since the user is not likely to recall a search keyword in a state that the user does not know the email message, utility of the user for the search function may be reduced.

Therefore, instead of the search function, it may be more effective for the user that a main message of the email is automatically selected by the mobile terminal. In this respect, the present invention is to suggest a mobile terminal that can allow a user to easily check information related to a recipient or a sender, which is primarily regarded as a main message.

DISCLOSURE

Technical Problem

An object of the present invention is to provide a mobile terminal and a control method therefor, in which user convenience is increased.

More specifically, an object of the present invention is to provide a mobile terminal that can allow a user to easily check information related to a sender or a recipient in the body text of an email, and a control method therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve the above objects, according one aspect of the present invention, a mobile terminal comprises a wireless communication unit for transmitting or receiving an email; a display unit for displaying a sender or recipient of the email and the body text of the email; and a controller for highlighting information related to the sender or information related to the recipient in the body text of the email.

In another aspect of the present invention, a control method for a mobile terminal comprises the steps of displaying a sender or recipient of an email and the body text of the email; searching for information related to the sender or information related to the recipient from the body text; and highlighting searched information if the information related to the sender or the information related to the recipient is searched.

It will be appreciated by persons skilled in the art that the technical solutions that could be achieved with the present invention are not limited to what has been particularly described hereinabove and the above and other technical solutions that the present invention could achieve will be more clearly understood from the following detailed description.

Advantageous Effects

Advantageous effects of a mobile terminal and a control method therefor according to the present invention are as follows.

According to at least one of the embodiments of the present invention, it is advantageous that a mobile terminal which has increased user convenience can be provided.

More specifically, it is advantageous that a mobile terminal, which can allow a user to easily check information related to a sender or recipient in the body text of an email, and a control method therefor can be provided.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

FIGS. 2A to 2C are views illustrating examples that a list of emails is displayed.

FIGS. 10A and 10B are views illustrating examples that a command which is recently performed is cancelled.

FIGS. 11A and 11B are views illustrating examples that a command applied to a specific area is cancelled.

FIGS. 13A and 13B are views illustrating a drafting screen of a conference mail.

BEST MODE FOR CARRYING OUT THE INVENTION

Figure 1A:
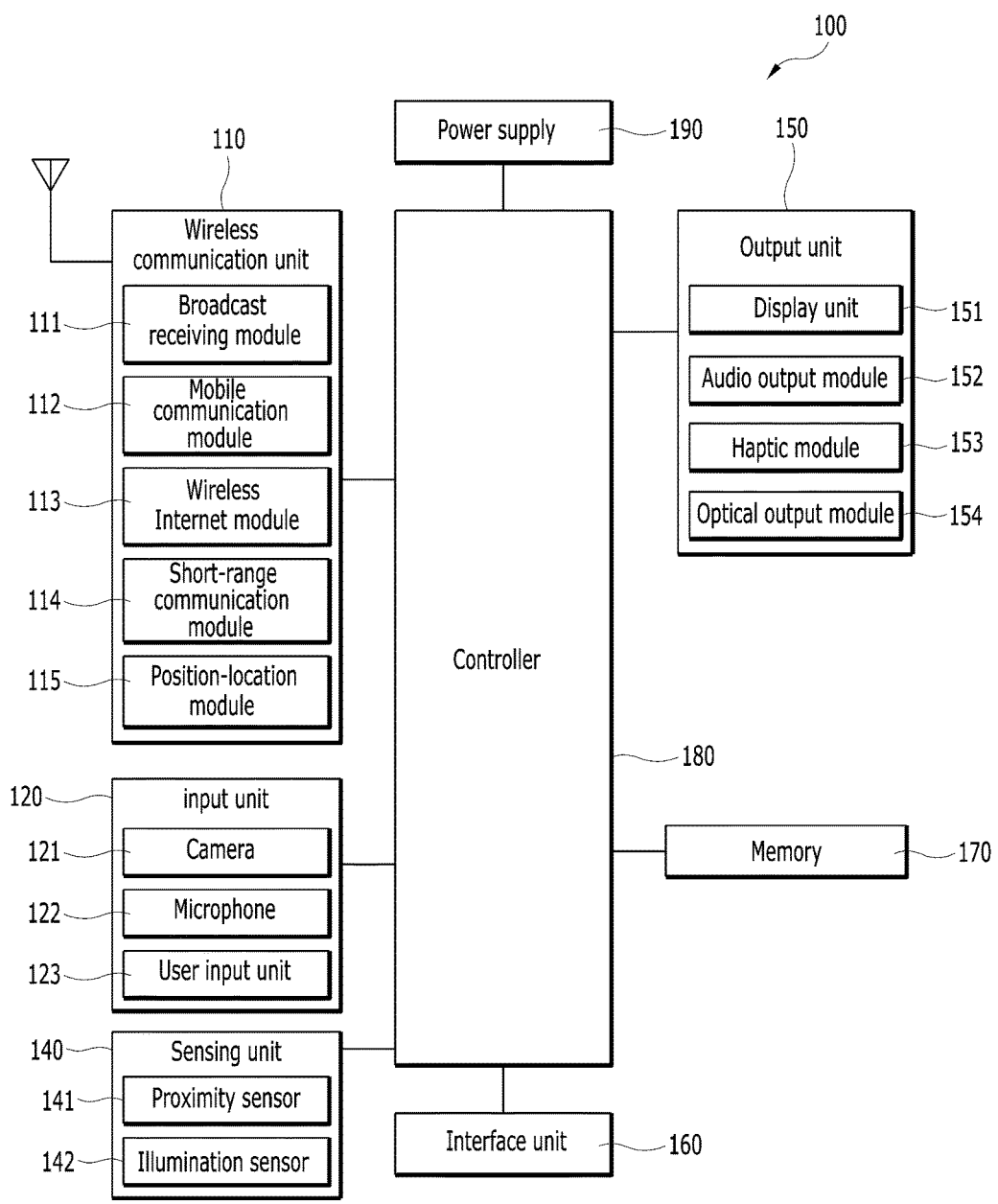
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
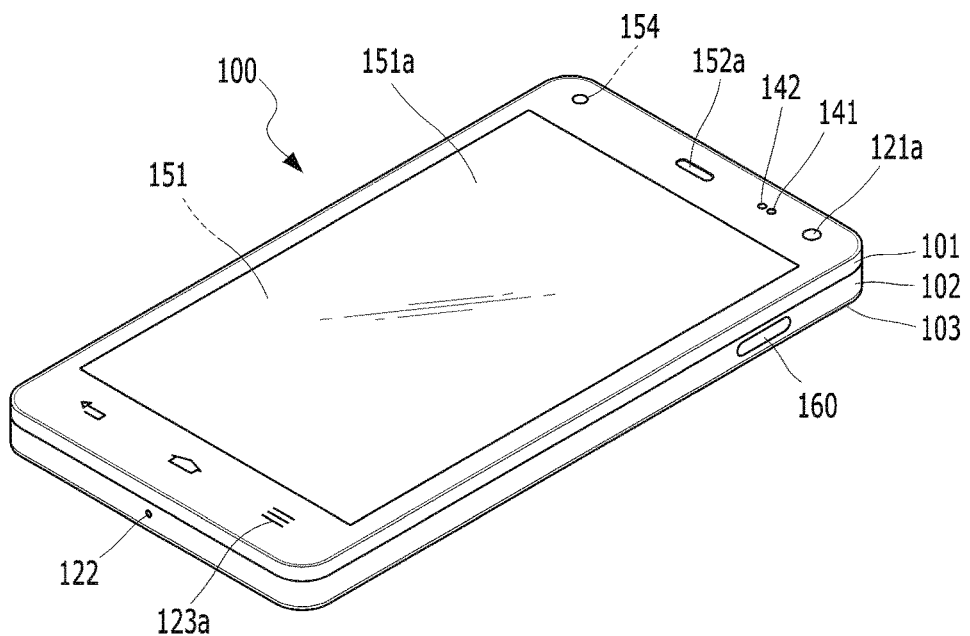
FIGS. 1B and 1C are conceptual views of one example of the mobile terminal, viewed from different directions.
Figure 1C:
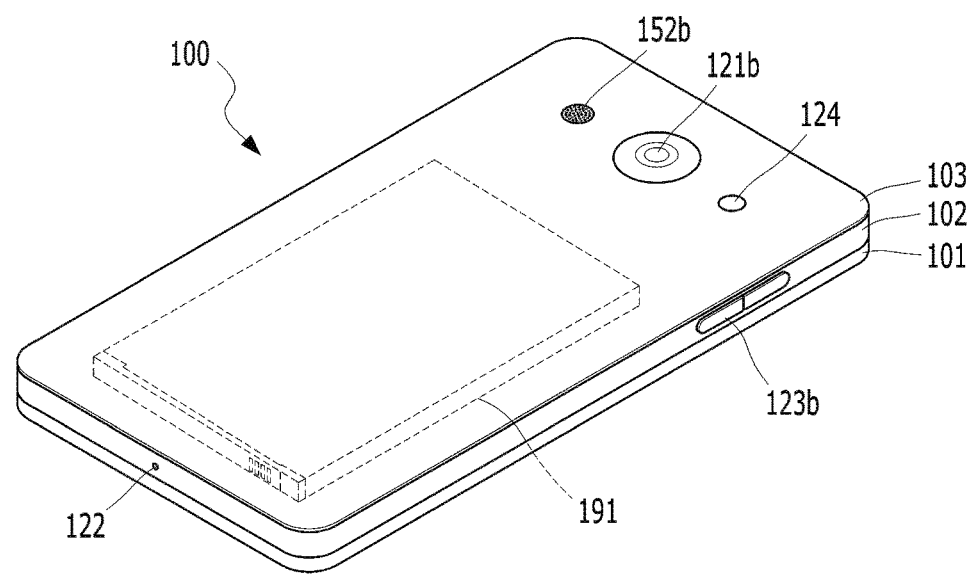

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in The FIG. 1A is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

For convenience of description, it is assumed that the mobile terminal 100 according to the present invention includes at least one of components shown in FIGS. 1A to 1C. In more detail, it is assumed that the mobile terminal 100 according to the present invention includes a wireless communication unit 110, a sensing unit, a display unit 151, a memory 170 and a controller 180. It may be assumed that the mobile terminal 100 according to the present invention further includes a microphone 122 for voice recording and a sensing unit 140 for sensing an operation state of the mobile terminal 100.

If the mobile terminal 100 according to the present invention transmits or receives an email, information related to a recipient or a sender is highlighted. Prior to description of the above embodiment, a user interface related to email will be described in detail.

If an email application is executed, the controller 180 may receive at least one of a list of emails received in an email account of a user and a list of emails transmitted through the email account of the user from an email server. If at least one of the list of the received emails and the list of the transmitted emails is received, the controller 180 may control the list of the emails to be displayed.

Figure 2B:
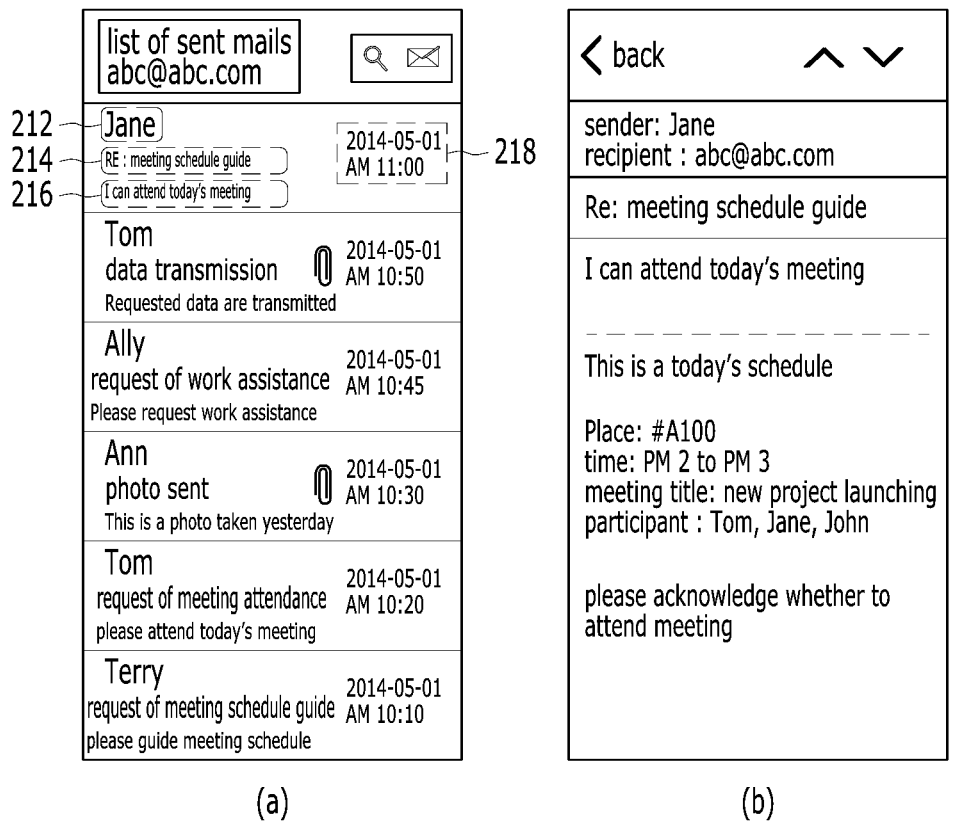
Figure 2C:
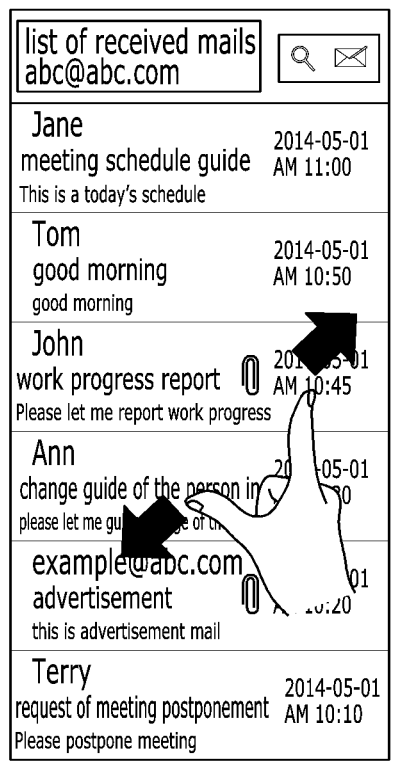
Figure 2C:
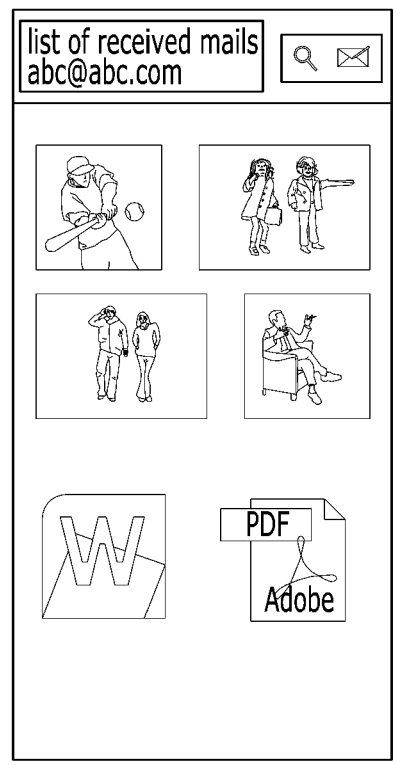

FIGS. 2A to 2C are views illustrating examples that a list of emails is displayed.

In (a) of FIG. 2A, the list of received emails is displayed. At least one of information 202 (for example, a name or email account of an opposite party who has transmitted an email) on an opposite party who has transmitted an email, a title 204 of the email, a brief body text message 206 of the email, and information 208 on the time when the email is received may be displayed as each item on the list of the received emails. At this time, the controller 180 may control an email checked by a user and an email which is not checked by a user to be visually distinguished and displayed on the list of the received emails. Also, if a specific group within an address book which is previously stored is selected, the controller 180 may control emails received from group members, which belong to the specific group, to be only displayed on the list of the received emails.

If any one of the list of the received emails is selected, the controller 180 may control details of the selected email to be displayed like the example shown in (b) of FIG. 2A. At this time, if the entire body text of the email cannot be output through the display unit 151, the user may check the body text of the email, which is not output, by scrolling the display unit 151 up and down.

If a user input for upsizing or downsizing the body text of the email is received by the user, the controller 180 may display body text of the email through upsizing or downsizing on the basis of the user input. For example, if a user input for displaying the body text of the email through upsizing is received, the controller 180 controls the body text of the email to be displayed through upsizing like the example shown in (c) of FIG. 2A (in (c) of FIG. 2A, a text size on the body text of the email is increased.) In this case, a user input for upsizing the body text area is, but not limited to, a pinch out input for increasing a distance between two pointers, and a user input for downsizing the body text area may be, but not limited to, a pinch in input for reducing the distance between the two pointers.

For another example, if the input for upsizing the body text of the email is input, the controller 180 may extract a main message only of the body text of the email and display the extracted message. For example, if the user input for upsizing the body text of the email is received, as shown in (d) of FIG. 2A, the controller 180 may display only the main message of the body text of the email. The controller 180 may extract a phone number type text string, a text string determined to indicate a place, a text string determined to indicate time, and a text string determined to indicate a name of a specific character as the main message.

If a display of the list of the transmitted emails is requested from a user while the list of the received emails is being displayed, the controller 180 may control the display unit 151 to display the list of the transmitted emails through an email account of the user as shown in (a) of FIG. 2B. At least one of information 212 (for example, a name or email account of an opposite party to which an email desires to be transmitted) on an opposite party to which an email is transmitted, a title 214 of the email, a brief body text message 216 of the email, and information 218 on the time when the email is transmitted may be displayed as each item on the list of the transmitted emails.

As described above through FIG. 2A, if a specific group within an address book which is previously stored is selected, the controller 180 may control emails transmitted to group members, which belong to the specific group, to be only displayed on the list of the transmitted emails.

If any one of the list of the transmitted emails is selected, the controller 180 may display details of the selected email as shown in (b) of FIG. 2B.

The aforementioned embodiment described with reference to (c) and (d) of FIG. 2A may be applied while details of the transmitted email are being displayed.

If a user input for upsizing the list of the emails is received from the user while the list of the emails is being displayed, the controller 180 may gather files attached to each email and display the gathered files.

For example, as shown in (a) of FIG. 2C, if the user input for upsizing the list of the received emails is received while the list of the received emails is being displayed, the controller 180 may control the display unit to display a list of the attached files comprised of the attached files attached to each of the received emails. Although not shown, if the user input for upsizing the list of the transmitted emails is received while the list of the transmitted emails is being displayed, the controller 180 may display a list of the attached files comprised of the attached files attached to each of the transmitted emails.

The respective attached files on the list of the attached files may be represented as their preview images. However, an attached file that cannot provide a preview image may be represented as an icon.

As shown in FIGS. 2A to 2C, if the list of the emails is displayed in a list type, the user may easily identify brief information on a plurality of emails. However, since the list of the received emails and the list of the transmitted emails are not displayed at the same time, a problem occurs in that it is difficult for the user to see gathered emails exchanged with a specific opposite party.

In this respect, the mobile terminal 100 according to the present invention may display the list of emails in a conversation type based on a predetermined opposite party. This detailed description will be understood with reference to FIGS. 3A and 3B.

Figure 3A:
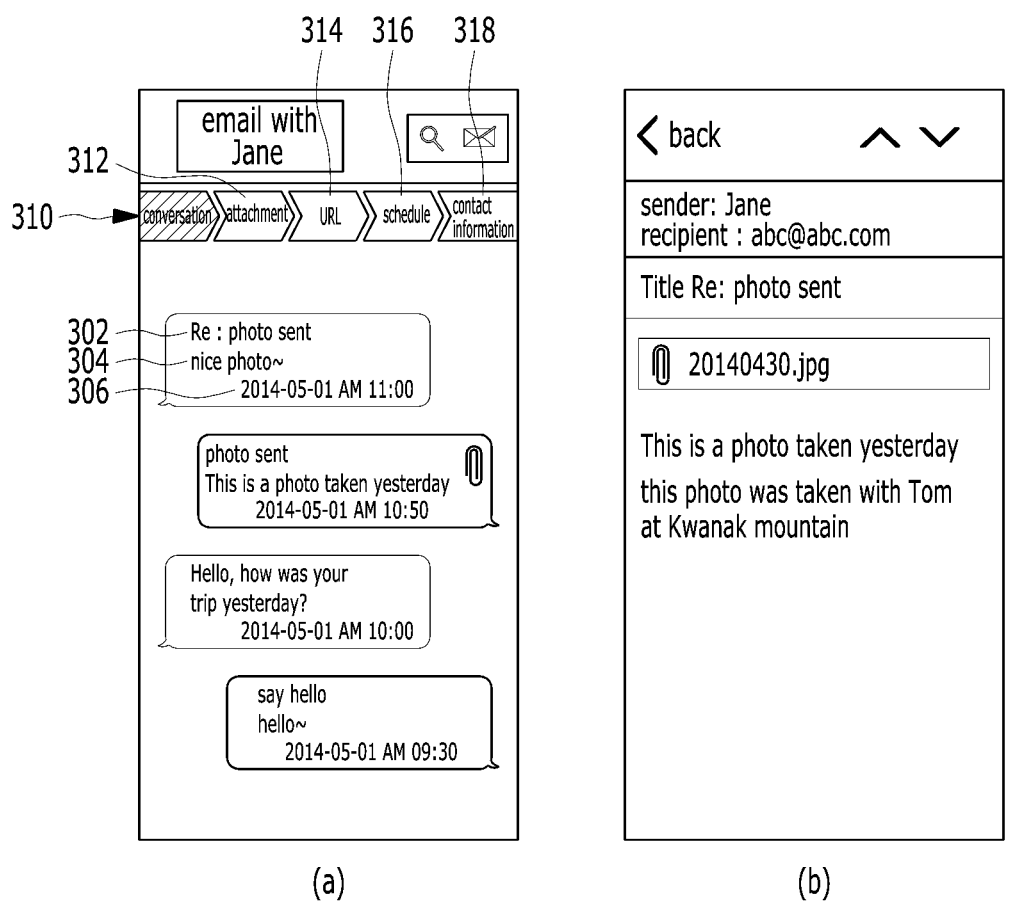
FIGS. 3A and 3B are views illustrating examples that a list of emails is configured in a conversation type.
Figure 3B:
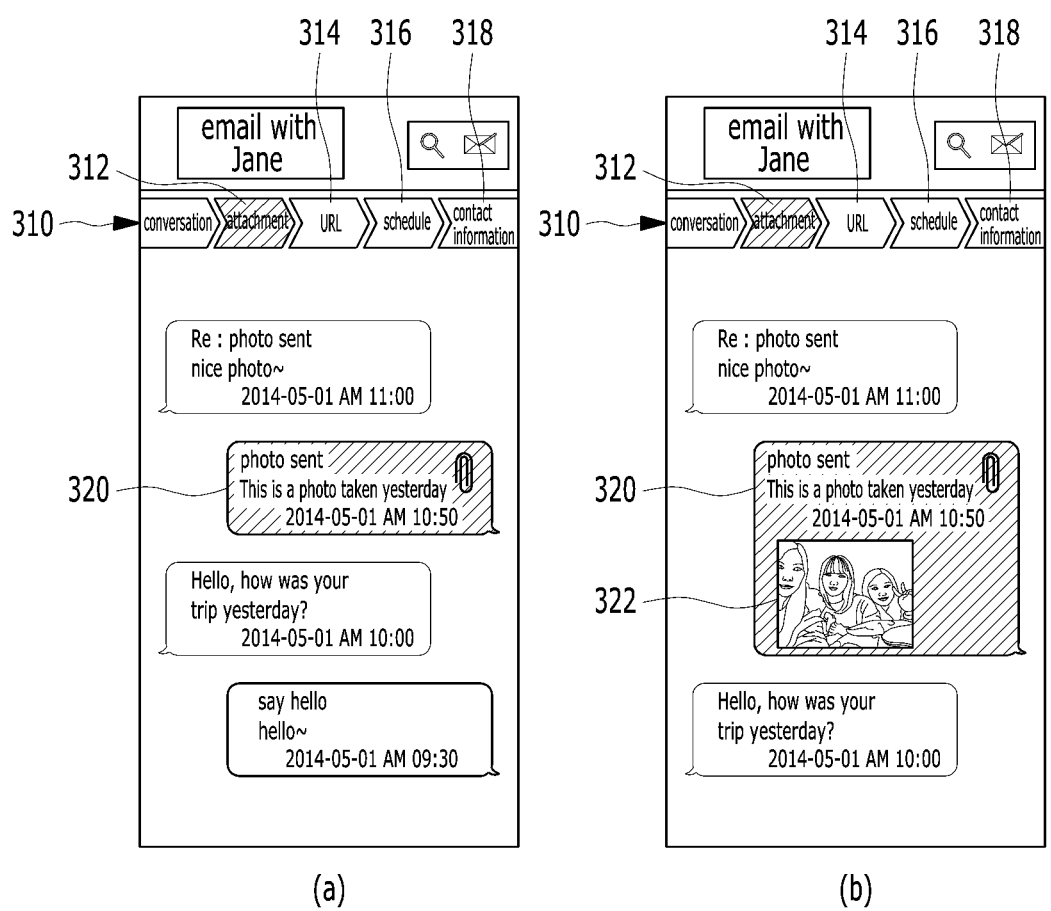

FIGS. 3A and 3B are views illustrating examples that a list of emails is configured in a conversation type. The controller 180 may display the list of emails in a conversation type by gathering emails received from a predetermined opposite party and emails transmitted to a predetermined opposite party. At this time, the emails received from the predetermined opposite party and the emails transmitted to the predetermined opposite party may be displayed to be visually identified from each other on the list of the emails. For example, as shown in (a) of FIG. 3A, the emails received from the predetermined opposite party are displayed at a left side, and the emails transmitted to the predetermined opposite party are displayed at a right side, whereby the emails received from the predetermined opposite party may visually be identified from the emails transmitted to the predetermined opposite party. Although not shown, the emails received from the predetermined opposite party may visually be identified from the emails transmitted to the predetermined opposite party by using a color, a pattern, etc.

At least one of a title 302 of the email, information 306 on the time when the email is received, and a brief body text message 304 of the email may be displayed as each item on the list of the conversation type emails. At this time, information on an opposite party who has transmitted the email or information on a target recipient to which the email is transmitted may be omitted from each item on the list of the emails. Instead of the information on an opposite party who has transmitted the email or the information on a target recipient to which the email is transmitted, information (that is, information on a target recipient to which the email is transmitted and information on an opposite party who has transmitted the email) on a predetermined opposite party may be displayed on a title area as shown in (a) of FIG. 3A.

If any one of the list of the conversation type emails is selected, the controller 180 may display details of the selected email as shown in (b) of FIG. 3A. The aforementioned embodiment described with reference to (c) and (d) of FIG. 2A may be applied to the case where any one of the list of the conversation type emails is selected.

If the user input for upsizing the list of the conversation type emails is received from the user while the list of the conversation type emails is being displayed, the controller 180 may gather attached files attached to each of emails exchanged with a predetermined opposite party and display the gathered files. Since the example that the list of the attached files is displayed has been described with reference to FIG. 2C, its detailed description will be omitted.

While the list of the conversation type emails is displayed, the controller 180 may highlight-display an email having a content designated by the user. To this end, the controller 180 may display a selection menu 310, which can select a desired content, as shown in (a) of FIG. 3A.

In (a) of FIG. 3A, the selection menu 310 includes an attached file 312, URL 313, a schedule 316, and contact information 318. The attached file 312 may be intended to highlight an email having an attached file, and the URL 314 may be intended to highlight email having an URL (Uniform Resource Locator) address. Also, the schedule 316 may be intended to highlight an email that includes a content related to schedule (for example, text string including place information or time information), and the contact information 318 may be intended to highlight an email that includes a content related to contact information (for example, phone number type text string, or email type text string). The controller 180 may highlight the corresponding email by controlling a color of an email having a content designated by a user or controlling a size and format of a content designated by a user within the email.

For example, if the attached file 312 of the selection menu 310 is selected, the controller 180 may highlight the email having the attached file. As shown in (a) of FIG. 3B, the controller 180 may highlight the email having the attached file by identifying a color of an email 320 having an attached file from a color of an email having no attached file or identifying a font format of the email 320 having an attached file from a font format of the email having no attached file. For another example, as shown in (b) of FIG. 3B, the controller 180 may highlight the email having an attached file by displaying a preview image 322 of the attached file attached to the email.

If the URL 314 of the selection menu 310 is selected, the controller 180 may highlight the email having URL address in the body text of the email. The controller 180 may highlight the email having the URL address by identifying a color of the email having the URL address from a color of an email having no URL address, or may highlight the email having the attached file by identifying a font format of the email having the URL address from a font format of the email having no URL address.

If the schedule 316 of the selection menu 310 is selected, the controller 180 may highlight the email having schedule information in the body text of the email. In this case, the schedule information may include a text indicating date or time or a text indicating a place. The controller 180 may highlight the email having schedule information by identifying a color of the email having schedule information from a color of an email having no schedule information, or may highlight the email having schedule information by identifying a font format of the email having schedule information from a font format of the email having no schedule information.

If the contact information 318 of the selection menu 310 is selected, the controller 180 may highlight the email having contact information in the body text of the email In this case, the contact information may include a phone number type text string or an email address type text string. The controller 180 may highlight the email having contact information by identifying a color of the email having schedule information from a color of an email having no contact information, or may highlight the email having contact information by identifying a font format of the email having contact information from a font format of the email having no contact information.

In the aforementioned example, if any one of the selection menu 310 is selected, the email having the selected content is highlighted. Unlike the aforementioned description, the controller 180 may expose an email only including a content selected from the list of emails. For example, if the attached file 312 of the selection menu 310 is selected, the controller 180 may display only the emails having the attached files among the emails exchanged with a predetermined opposite party. If the URL 314 of the selection menu is selected, the controller 180 may display only the emails having URL address in the body text of the emails exchanged with a predetermined opposite party.

The mobile terminal 100 according to the present invention may display details of an email in a card type. This detailed description will be understood with reference to FIGS. 4A to 4D.

FIGS. 4A to 4D are views illustrating examples that a card type email is displayed.

Figure 4A:
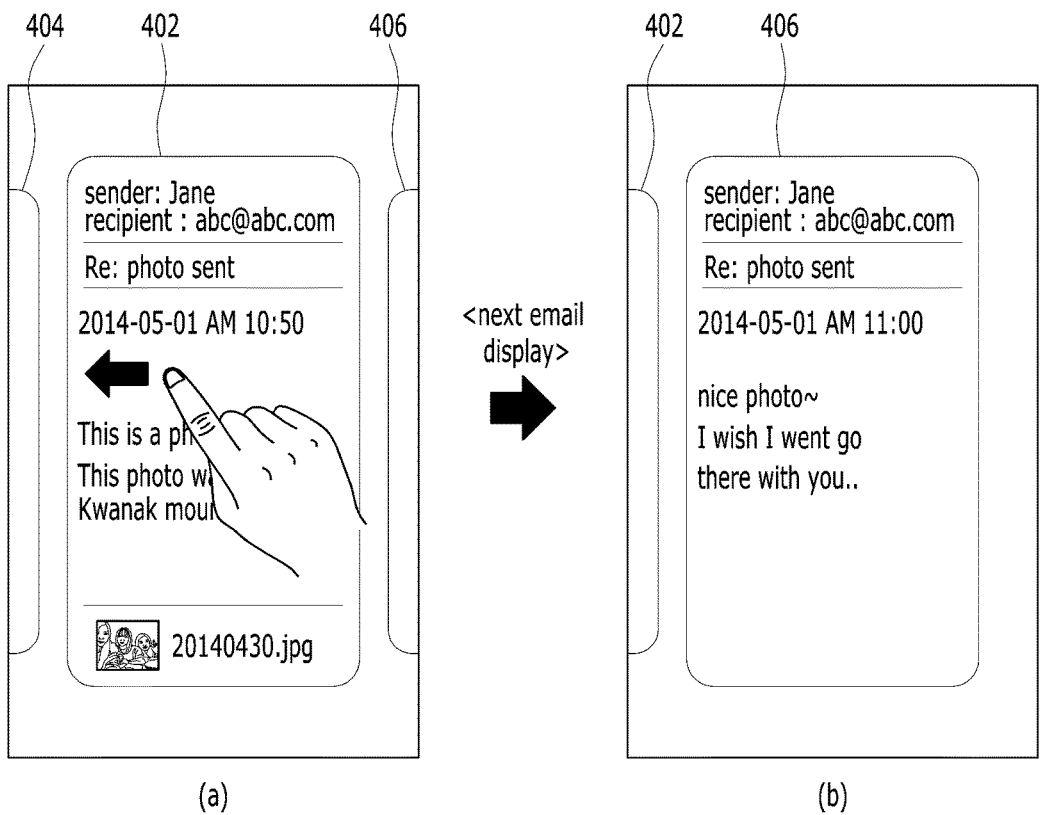
FIGS. 4A to 4D are views illustrating examples that a card type email is displayed.

As shown in (a) of FIG. 4A, the controller 180 may display an email through a pop-up window 402 having a card type. As shown in (a) of FIG. 4A, at least one of information (or information on an opposite party to which an email is transmitted) on an opposite party who has transmitted an email, a title of an email, information on the time when an email is received, and the body text of an email may be displayed on the pop-up window 402 as shown in (a) of FIG. 4A.

If the entire body text of the email cannot be displayed through the pop-up window 402 due to large capacity of the body text of the email, the user may check the body text of the email which is not displayed, by scrolling the pop-up window 402 up and down.

Pop-up windows 402 and 404 indicating a previous email and next email of the email which is currently displayed may partially be displayed on left and right sides of the pop-up window 402. If a user input for changing the previous email and the next email is received, the controller 180 may display the previous email or the next email as shown in (b) of FIG. 4A.

In this case, the user input for changing the current email to the previous email and the next email may indicate that a pointer is dragged in a left and right direction after the pop-up window 402 is touched, or may indicate that a pointer is dragged to the center after the pop-up window 404 indicating the previous mail or the pop-up window 406 indicating the next email is touched, wherein the pop-up window 404 and the pop-up window 406 are displayed on left and right sides of the display unit 151. In this case, the drag input may mean that the pointer moves from a first point to a second point, or may mean that the pointer is released from the display unit 151 after the point moves from the first point to the second point. In the following embodiments, the drag input may mean the aforementioned description.

If a user input for dragging the pop-up window 402 toward an upper side or a lower side of the display unit 151 is received, the controller 180 may delete an email displayed through the pop-up window 402 or display a screen for drafting an answer of the email displayed through the pop-up window 402.

Figure 4B:
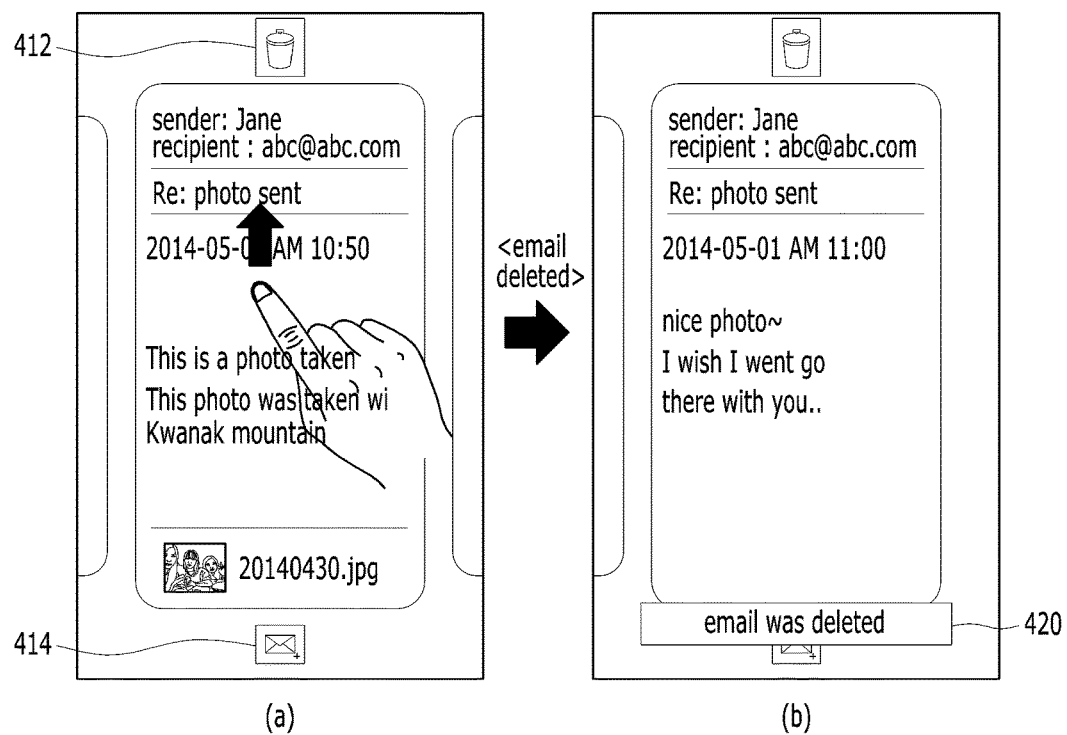

For example, as shown in (a) of FIG. 4B, if a user input for dragging the pop-up window 402 in a first direction (an upper side in FIG. 4B) is received, the controller 180 may delete the email displayed through the pop-up window. At the same time, the controller 180 may display a toast message 420 indicating that the email has been deleted, as shown in (b) of FIG. 4B.

Figure 4C:
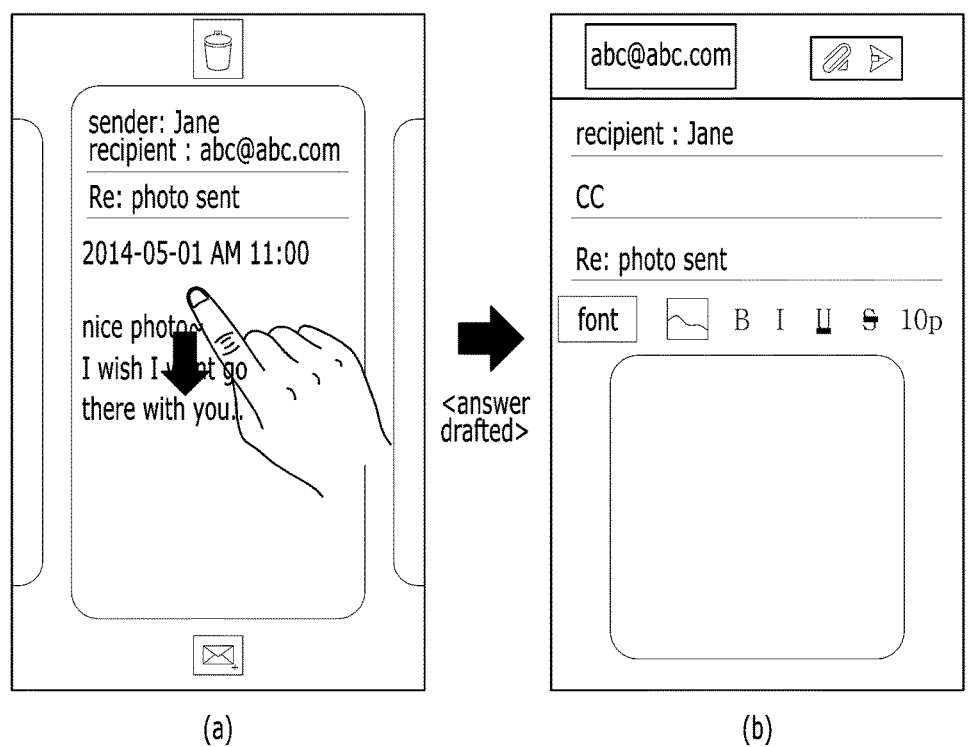

As shown in (a) of FIG. 4C, if a user input for dragging the pop-up window 402 in a second direction (a lower side in FIG. 4C) is received, the controller 180 may display an email drafting screen for drafting an answer of the email displayed through the pop-up window 402 as shown in (b) of FIG. 4.

As shown in FIGS. 4B and 4C, in order to indicate that the email is deleted if the pop-up window 402 is dragged in a first direction and the answer can be drafted when the pop-up window 402 is dragged in a second direction, a delete icon 412 corresponding to deletion may be displayed in a first direction of the pop-up window 402, and an answer icon 414 corresponding to the answer may be displayed in a second direction of the pop-up window 402.

Instead of dragging the pop-up window 402 in a first direction or a second direction, even in the case that the delete icon 412 or the answer icon 414 is touched, an equivalent function may be performed.

In FIGS. 4B and 4C, as the pop-up window 402 is dragged in a predetermined direction, the email displayed through the pop-up window 402 may be processed. Unlike the examples shown in FIGS. 4B and 4C, the controller 180 may display a menu for processing the email which is being displayed.

Figure 4D:
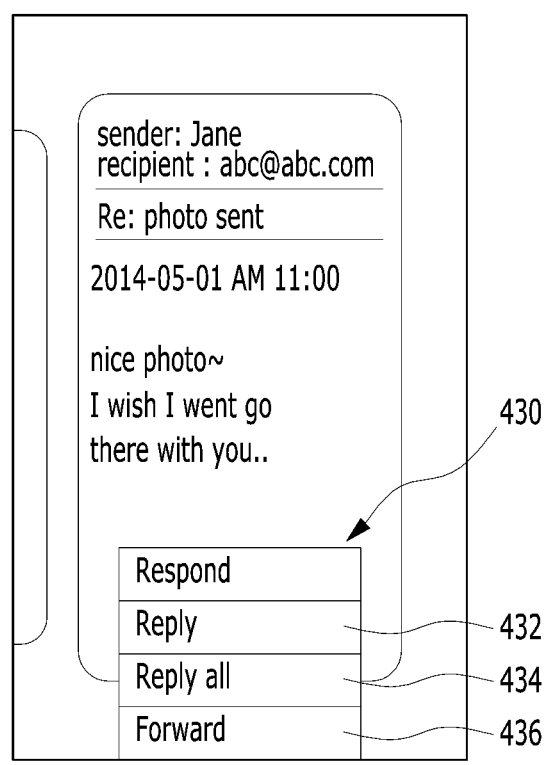

For example, FIG. 4D illustrates that a menu 430 for processing the email displayed through the pop-up window 402 is displayed. If a previously set user input is received while the pop-up window 402 is being displayed, the controller 180 may display the menu 430 for processing the email displayed through the pop-up window 402 as shown in FIG. 4D. In this case, the previously set user input for displaying the menu 430 may be, but not limited to, a touch input for touching the pop-up window 402 as much as the number of predetermined times or more or a touch input (for example, pinch in or pinch out input) of a previously set pattern in the pop-up window 402.

An answer button 432 of buttons included in the menu 430 shown in FIG. 4D may be intended to draft an answer to an opposite party who has transmitted an email which is being output through the pop-up window 402. A whole answer button 434 may be intended to draft an answer to all target recipients who have received the corresponding email as well as an opposite party who has transmitted the email which is being output through the pop-up window 403. Additionally, a transfer button 436 may be intended to transfer the email, which is being output through the pop-up window 402, to another user.

Although the answer button 432, the whole answer button 434 and the transfer button 436 are included in the menu 430 in FIG. 4D, the components of the menu may be different from those of FIG. 4D.

If the email displayed through the pop-up window 402 has an attached file, the controller 180 may allocate a part of the pop-up window to an attached file display area. A detailed description of the display of the attached file will be understood with reference to FIGS. 5A and 5B.

Figure 5A:
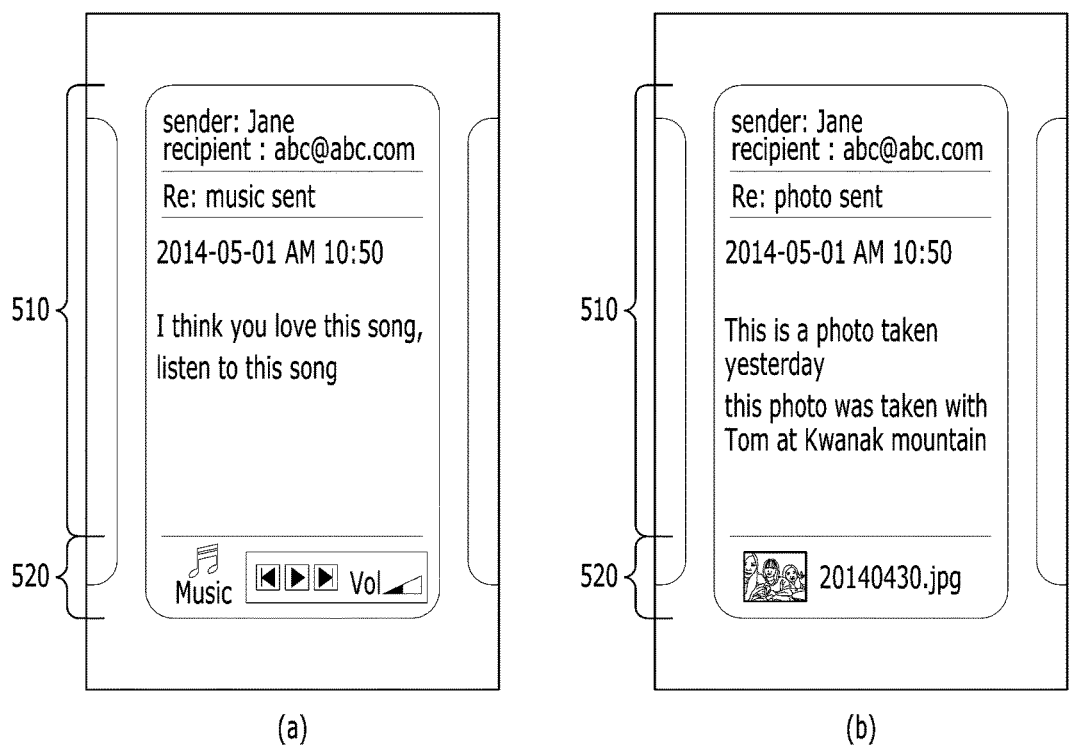
FIGS. 5A and 5B are views illustrating an attached file display area.
Figure 5B:
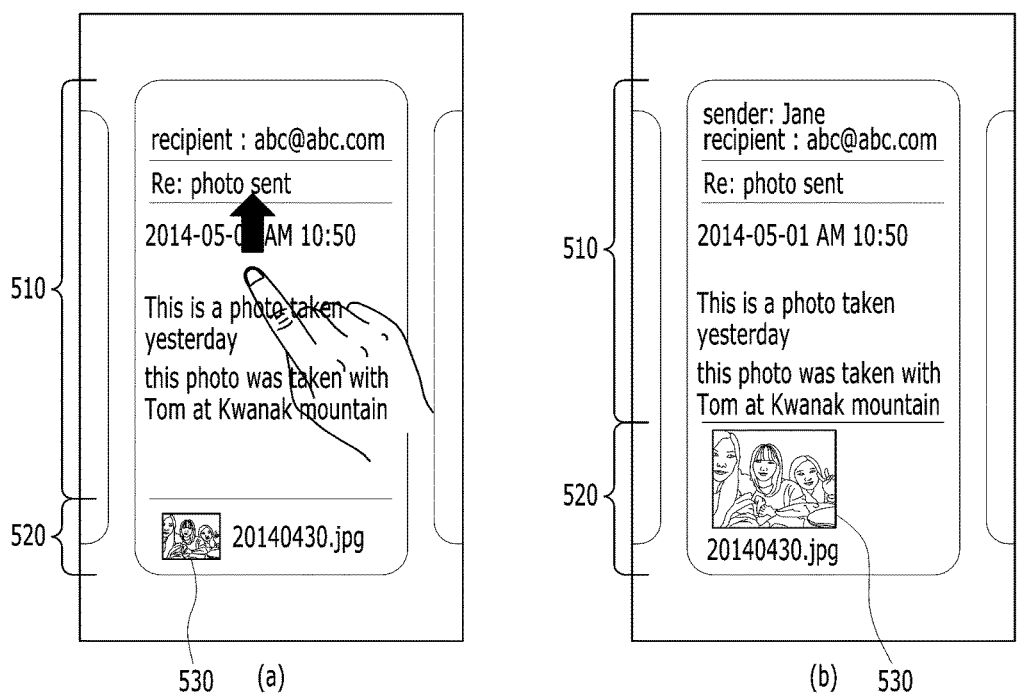

FIGS. 5A and 5B are views illustrating an attached file display area. If the email displayed through the pop-up window has an attached file, the controller 180 may divide the pop-up window into a body text display area 510 and an attached file display area 520 as shown in (a) of FIG. 5A. the controller 180 may output the body text of the email through the body text display area 510 and display the attached file attached to the email through the attached file display area 520.

If the attached file attached to the email is a music file or moving picture file, the controller 180 may display a play control menu for controlling a play of the attached file on the attached file display area 520 as shown in (a) of FIG. 5A. The controller 180 may play the attached file or stop play of the attached file through a user input for the play control menu.

If the attached file attached to the email is image, moving picture and document files, the controller 180 may display a preview image of the attached file on the attached file display area 520 as shown in (b) of FIG. 5A. If the preview image is selected, the controller 180 may download the attached file and then output the downloaded file on the display.

The user may identify the entire body text of the email by scrolling the body text display area 510 of the pop-up window up and down. At this time, if a user input for continuously scrolling the body text of the email is received even though the user scrolls the body text display area 510 to reach the lowest (or uppermost) end of the body text of the email, the controller 180 may reduce the size of the body text display area and increase the size of the attached file display area 520.

For example, FIG. 5B illustrate that the size of the attached file display area 520 is increased as the size of the body text display area 510 is reduced.

As shown in (a) of FIG. 5B, even though the body text display area 510 displays the lowest end of the body text of the email, if the user input for continuously scrolling the body text display area 510 to the lowest end is received, the controller 180 may reduce the size of the body text display area 510 and increase the size of the attached file display area 520 as shown in (b) of FIG. 5B.

The controller 180 may increase a size of a preview image 530 in accordance with increase of the size of the attached file display area 520 or display more preview images in accordance with the increase of the size of the attached file display area 520.

For example, referring to (a) and (b) of FIG. 5B, the size of the preview image 530 is increased as the size of the attached file display area 520 is increased.

In the same manner as the aforementioned example, the mobile terminal 100 according to the present invention may display the list of emails in a list type or display the list of emails in a conversation type. Also, the mobile terminal 100 may display the emails in a card type.

The mobile terminal 100 according to the present invention may change a display type of the list of emails on the basis of the user input. For example, in a state that the list of emails is displayed in a list type, if a previously set user input is received, the display type may be changed to a conversation type or a card type. This detailed description will be understood with reference to FIGS. 6A to 6D.

FIGS. 6A to 6D are views illustrating examples that a display type of a list of emails is changed.

Figure 6A:
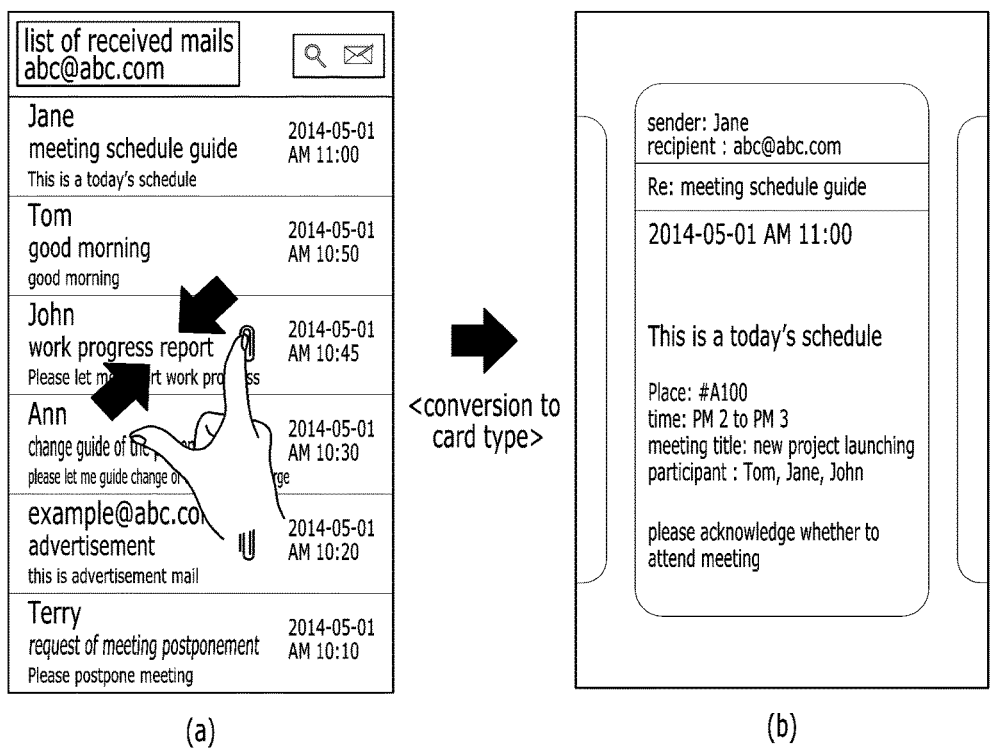
FIGS. 6A to 6D are views illustrating examples that a display type of a list of emails is changed.

As shown in (a) of FIG. 6A, while the list of emails is being displayed in a list type, if a previously set user input (pinch in input in which a distance between two pointers touching the display unit 151 is short is illustrated in (a) of FIG. 6A) is input, the controller 180 may control the display unit 151 to display the emails in a card type as shown in (b) of FIG. 6A.

At this time, a range of the emails which will be configured in a card type may be the same as a range of the list of the emails of a list type. For example, if the list of the emails of a list type shown in (a) of FIG. 6A is related to received emails, the emails configured in a card type may be related to the received emails. Although not shown, if the list of the emails of a list type is related to transmitted emails, the emails configured in a card type may be limited to the transmitted emails.

While the list of emails is being displayed in a card type, if a previously set user input (pinch out input in which a distance between two pointers touching the display unit 151 is long is illustrated in (b) of FIG. 6A) is input, the controller 180 may control the display unit 151 to display the emails in a list type as shown in (a) of FIG. 6A.

Figure 6B:
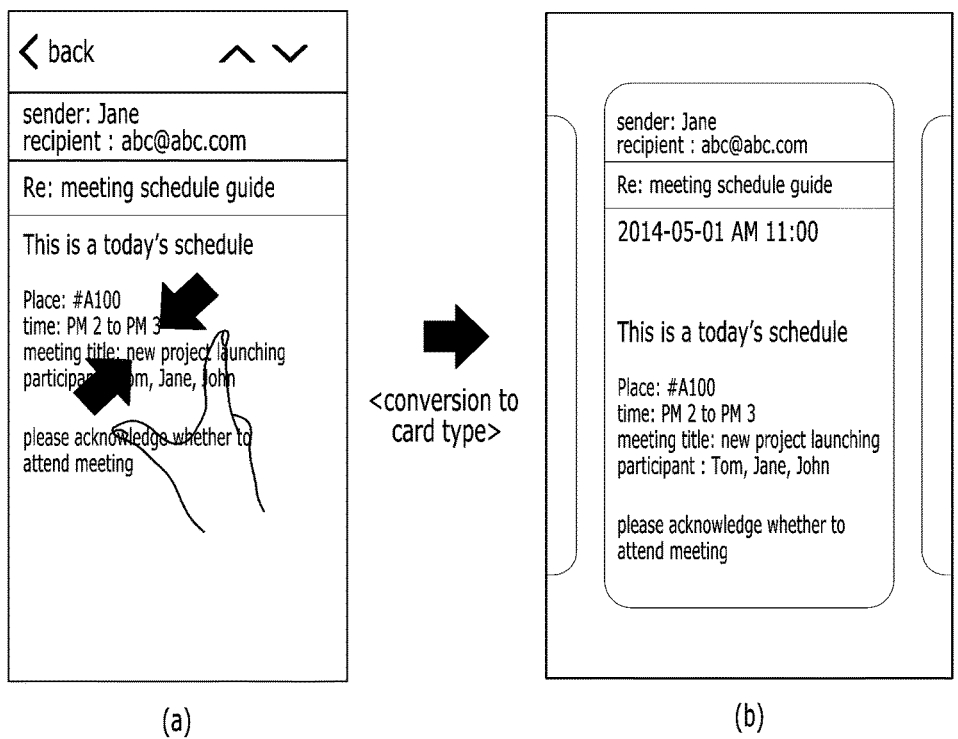

As shown in (a) of FIG. 6B, while detailed information of the selected email is being displayed, if a previously set user input (pinch in input is illustrated in (a) of FIG. 6B) is received, the controller 180 may display the emails in a card type as shown in (b) of FIG. 6B. At this time, the email which should be configured in a card type may be limited to at least one of an email received from an opposite party of the selected email and an email transmitted to the opposite party of the selected email.

Figure 6C:
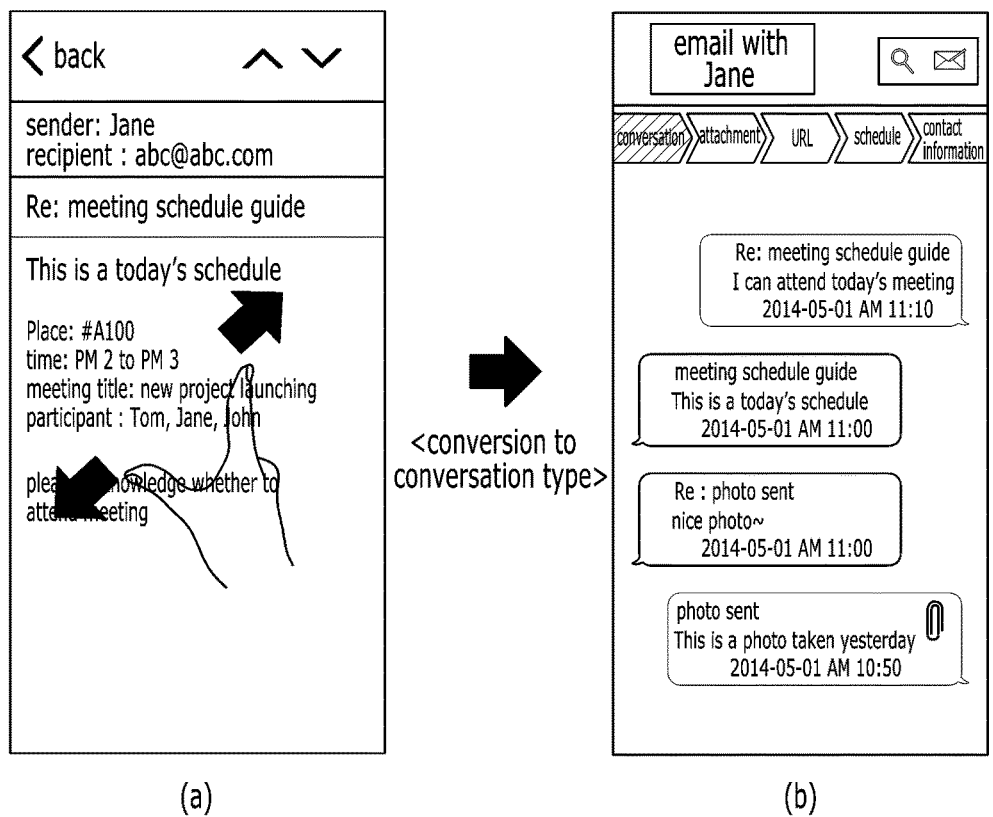

While detailed information of the selected email is being displayed, if a previously set user input (pinch out input is illustrated in (a) of FIG. 6C) is received, the controller 180 may display the list of emails exchanged with the opposite party of the email selected in a conversation type as shown in (b) of FIG. 6C.

Figure 6D:
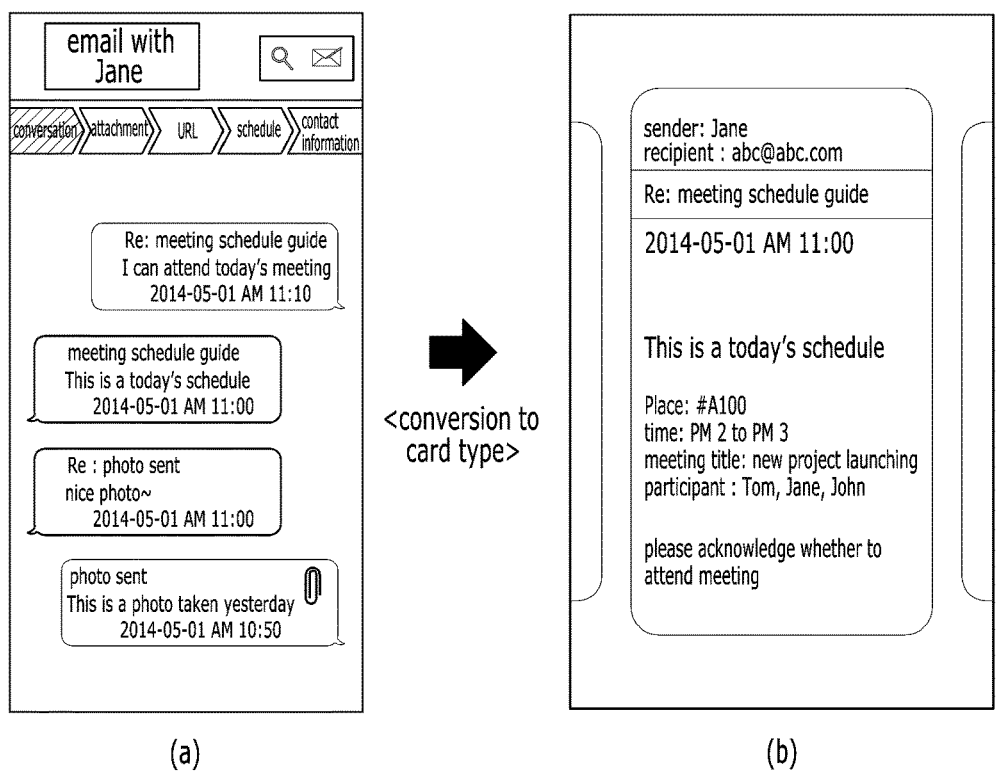

As shown in (a) of FIG. 6D, while emails exchanged with a predetermined opposite party are being displayed in a conversation type, if a previously set user input (pinch in input is illustrated in (a) of FIG. 6C) is received, the controller 180 may display the emails in a card type as shown in (b) of FIG. 6D. At this time, the email which should be configured in a card type may be limited to at least one of an email received from a predetermined opposite party designated by the list of emails of a conversation type and an email transmitted to the predetermined opposite party.

In the examples of FIGS. 6A to 6D, as pinch in and pinch out are input, the display type of the email is changed. The display type of the email may be changed by a touch input different from the shown examples. Also, the display type of the email may be changed on the basis of a gesture input (for example, gesture input for rotating the mobile terminal 100 at a predetermined angle or more) based on the mobile terminal 100.

Next, the email drafting screen that may be applied to the mobile terminal 100 according to the present invention will be described in detail.

Figure 7A:
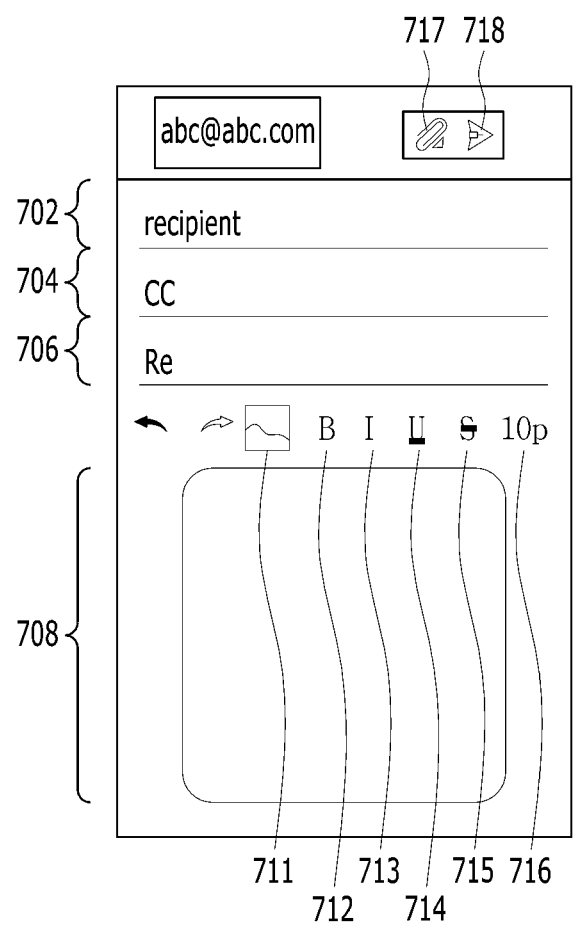
FIGS. 7A to 7C are views illustrating an email drafting screen.
Figure 7B:
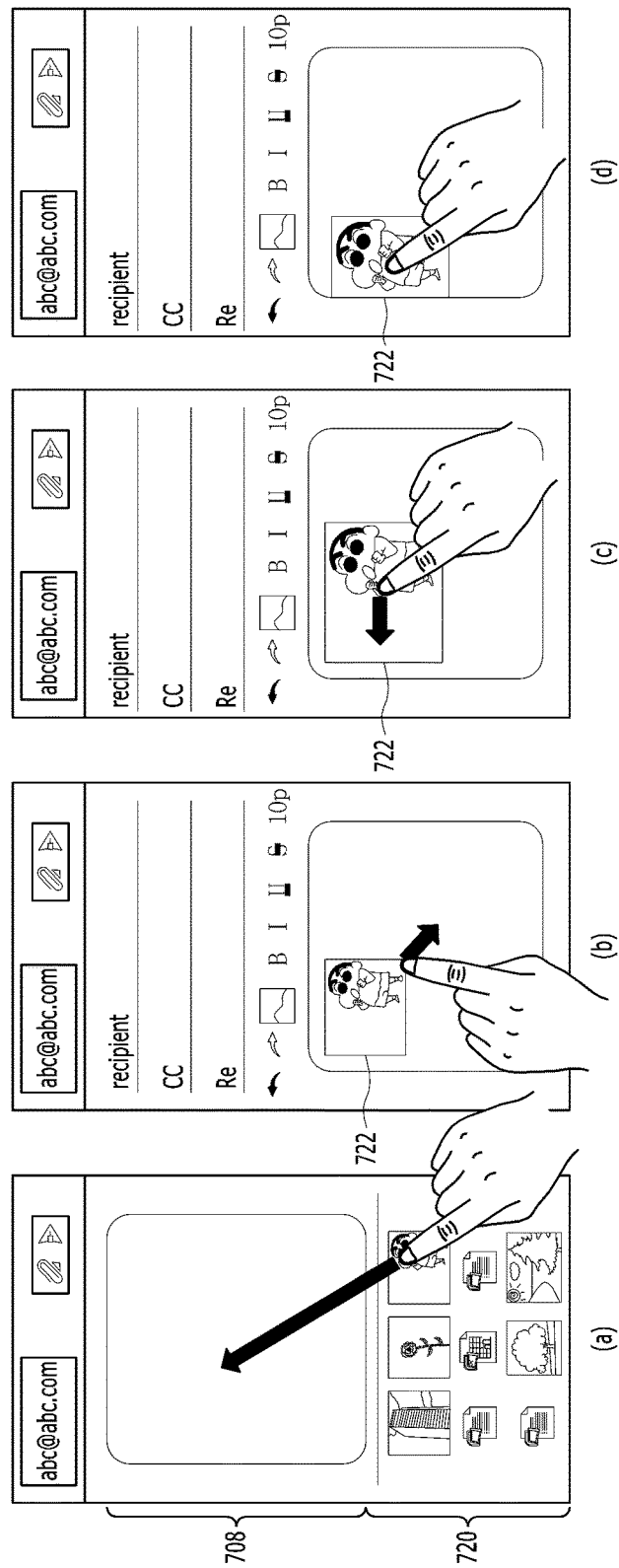
Figure 7C:
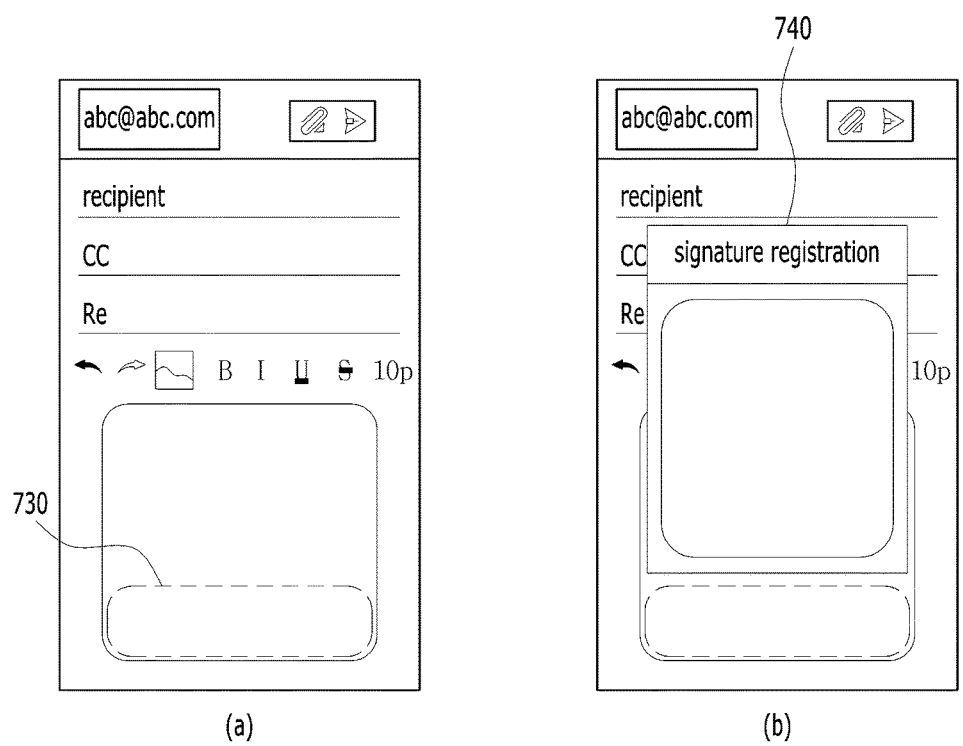

FIGS. 7A to 7C are views illustrating an email drafting screen. If a user input for drafting a new email is received or a user input for drafting an answer to a predetermined email is received, the controller 180 may output the email drafting screen for drafting an email.

The email drafting screen may basically include a recipient input area 702 for inputting a target recipient of an email, a referrer input area 704 for inputting a reference recipient of an email, a title input area 706 for inputting a title of an email, and a body text area 708 for inputting the body text of an email. Additionally, a button (712 (bold button), 713 (italic button), 714 (underline button), 715 (strike-out button), 716 (font size control button), etc.) for controlling a format of a text which will be input to the body text area, a button 717 for attaching a file, a multimedia file insertion button 711 for inserting multimedia file to the body text area, and a button 718 for transmitting a drafted email may be displayed on the email drafting screen.

A target recipient for receiving an email may be input to the recipient input area 702 or the referrer input area 704. A name of the target recipient for receiving an email or an email address of the target recipient for receiving an email may be listed in the recipient input area 702 or the referrer input area 704. If the name of the target recipient for receiving an email is input to the recipient input area 702 or the referrer input area 704, the controller 180 may extract an email address corresponding to the name of the target recipient from an address book (or address book stored in a mail server) stored in the memory 170 to specify the target recipient for receiving an email.

Moreover, a plurality of target recipients may be input to the recipient input area 702 or the referrer input area 704. In this case, the target recipients may be identified from one another by special characters such as ',', ';', ':'.

A main message which is desired by the user to be transmitted to the target recipient may be input to the body text area 708. A multimedia file as well as text may be attached to the body text area 708.

For example, if the multimedia file insertion button 711 is touched, the controller may control the display unit 151 to display a list 720 of multimedia files as shown in (a) of FIG. 7B. In this case, the multimedia file may include at least one of files for processing image, music, text, etc. such as image, moving picture, and document. The controller 180 may display the list 720 of multimedia files based on a recent reading order of the user, or may display the list 720 of multimedia files based on a predetermined position (for example, predetermined folder).

If at least one of the list 720 of multimedia files is dragged to the body text area 708, the controller 180 may insert the selected multimedia file to the body text area as shown in (b) of FIG. 7B. An image 722 is inserted to the body text area 708 in (b) of FIG. 7B. If the multimedia file is attached within the body text area 708, a displayed size and position of the multimedia file attached within the body text area 708 may be controlled by a user input. For example, in the example shown in (b) of FIG. 7B, if a pointer which touches one corner of the image 722 is dragged to the outside of the image 722, as the touched corner is moved to the position where the pointer is dragged, the size of the image 722 may be upsized, as shown in (c) of FIG. 7B. By contrast, if a pointer which touches one corner of the image 722 is dragged to the inside of the image 722, as the touched corner is moved to the position where the pointer is dragged, the size of the image 722 may be downsized.

Moreover, in the example shown in (c) of FIG. 7B, if the pointer which touches the image 722 is dragged, the controller 180 may change a display position of the image 722 to the position where the pointer is dragged. At this time, if the pointer is dragged to allow the image 722 to partially get out of the display unit 151, the controller 180 may delete the image 722 inserted to the body text area 708. For example, as shown in (d) of FIG. 7B, as the pointer which touches the image 722 moves to the outside of the display unit 151, if the image 722 partially disappears from the display unit 151, the controller 180 may delete the image 722 from the body text area 708.

As shown in (a) of FIG. 7C, the body text area 708 of the email may partially be allocated to a signature area 730 to which a signature will be inserted. In a state that a signature is not registered, if the signature area 730 is touched, the controller 180 may display a signature registration window 740 for registering a signature as shown in (b) of FIG. 7C.

The user may generate a signature through a text input based on a keypad or generate a signature through writing input.

If a signature which will be inserted to the body text area of an email is previously registered, the controller 180 may insert a signature previously registered in the last of the body text area automatically or in response to a user input. At this time, if a plurality of signatures are previously registered, the controller 180 may display a signature designated as default and exchange the signature in response to a user input. For another example, the controller 180 may automatically select any one of a plurality of signatures in accordance with statuses. This detailed description will be understood with reference to FIGS. 8A to 8D.

FIGS. 8A to 8D are views illustrating examples that a signature is inserted to a body text area.

If a user input for dragging a signature displayed on the body text area to a right side or a left side is input, the controller 180 may exchange a signature. In (a) and (b) of FIG. 8A, a Korean signature 810 of a user is changed to English signature 820.

The controller 180 may determine a signature, which will be inserted to the body text area, based on a language of a text inserted to the body text area. For example, if the text of the body text area is configured in a first language only, the controller may select a first signature drafted by the first language, and if the text of the body text area is configured in a second language only, the controller may select a second signature drafted by the second language. For example, if the text drafted in Korean language is inserted to the body text area as shown in (a) of FIG. 8B, the controller 180 may insert the signature 810 drafted in Korean language to the body text area. Unlike this, as shown in (b) of FIG. 8B, if the text drafted in English is inserted to the body text area, the controller 180 may insert a signature 820 drafted in English to the body text area.

If both the text drafted in the first language and the text drafted in the second language are included in the body text area, the controller 180 may determine the signature based on a language to which an initially input text is applied. For example, as shown in (c) of FIG. 8B, although the text drafted in Korean language and the text drafted in English are included in the body text area, if the body text area starts with the text drafted in Korean language, the controller 180 may insert the signature 810 drafted in Korean language to the body text area.

Although not shown, the controller 180 may determine a signature which will be inserted to the body text area by comparing the amount of the text drafted in the first language with the amount of the text drafted in the second language. For example, if the amount of the text drafted in Korean language is more than the amount of the text drafted in English, the controller may insert the signature drafted in Korean language to the body text area.

For another example, the controller 180 may determine the signature which will be inserted to the body text area, on the basis of a recipient.

Figure 8A:
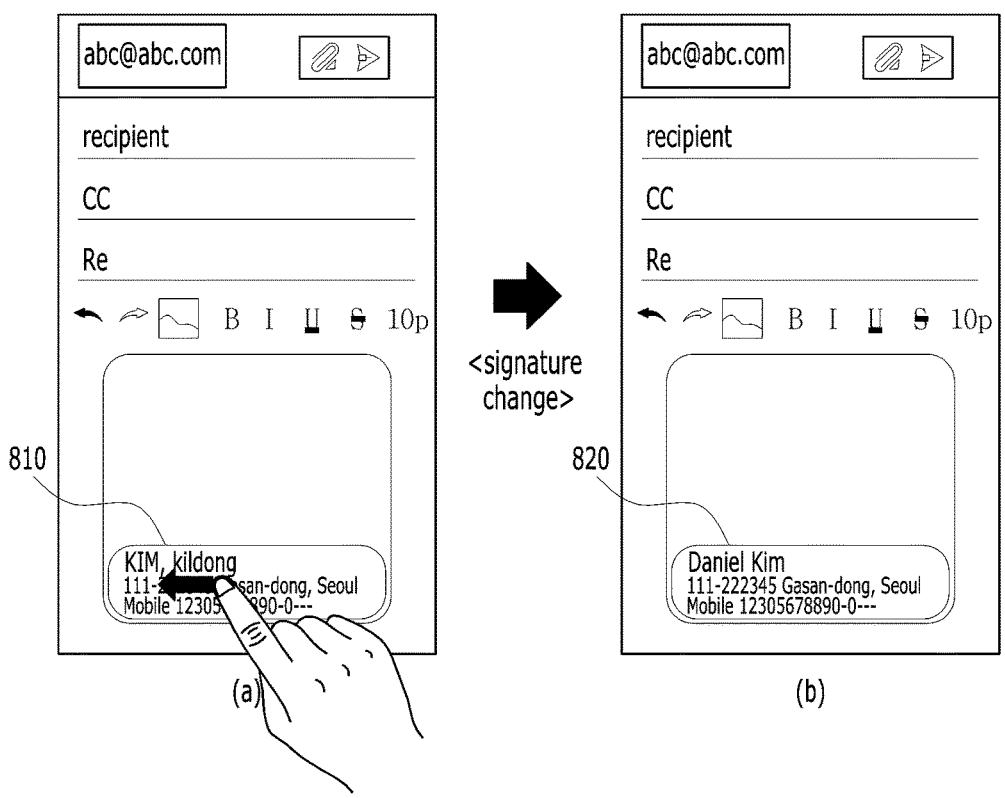
FIGS. 8A to 8D are views illustrating examples that a signature is inserted to a body text area.
Figure 8B:
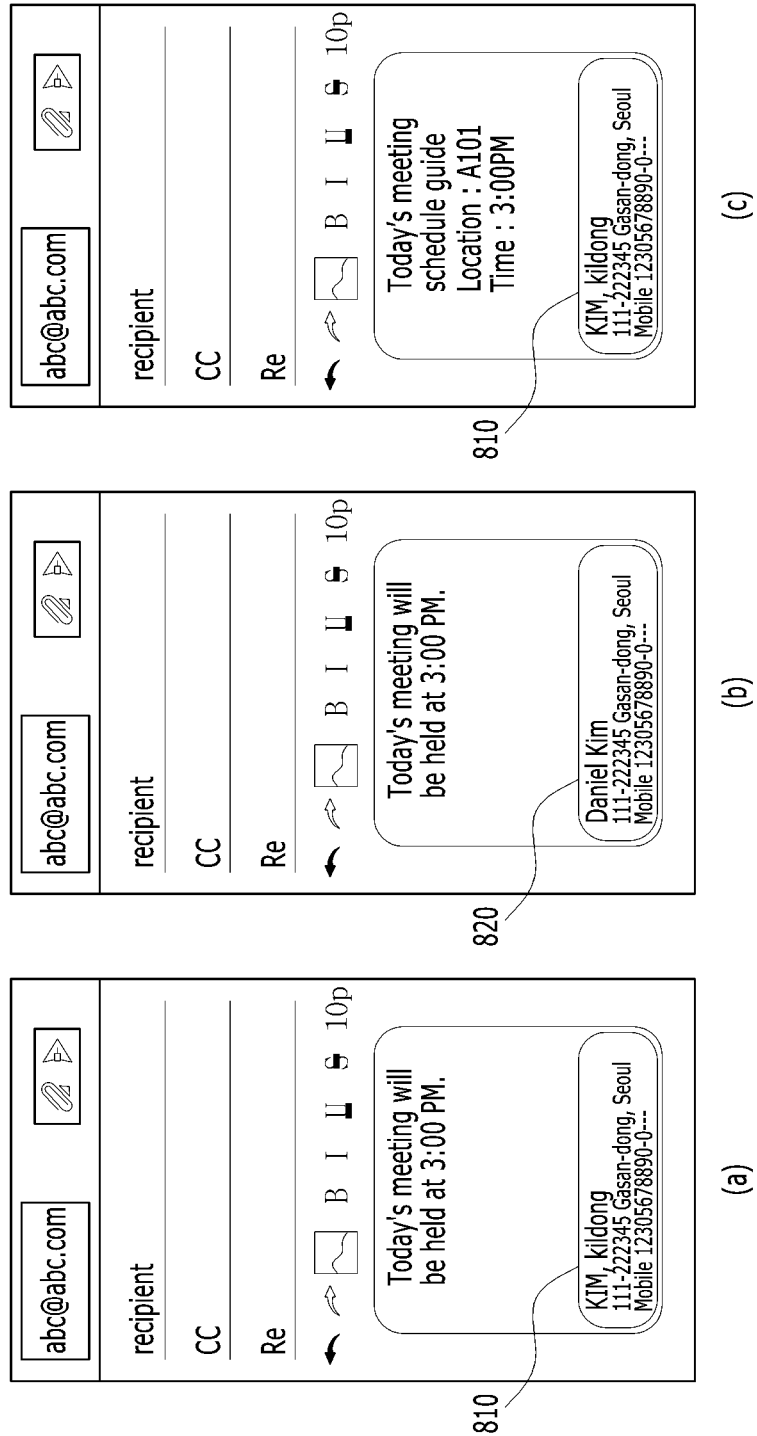
Figure 8C:
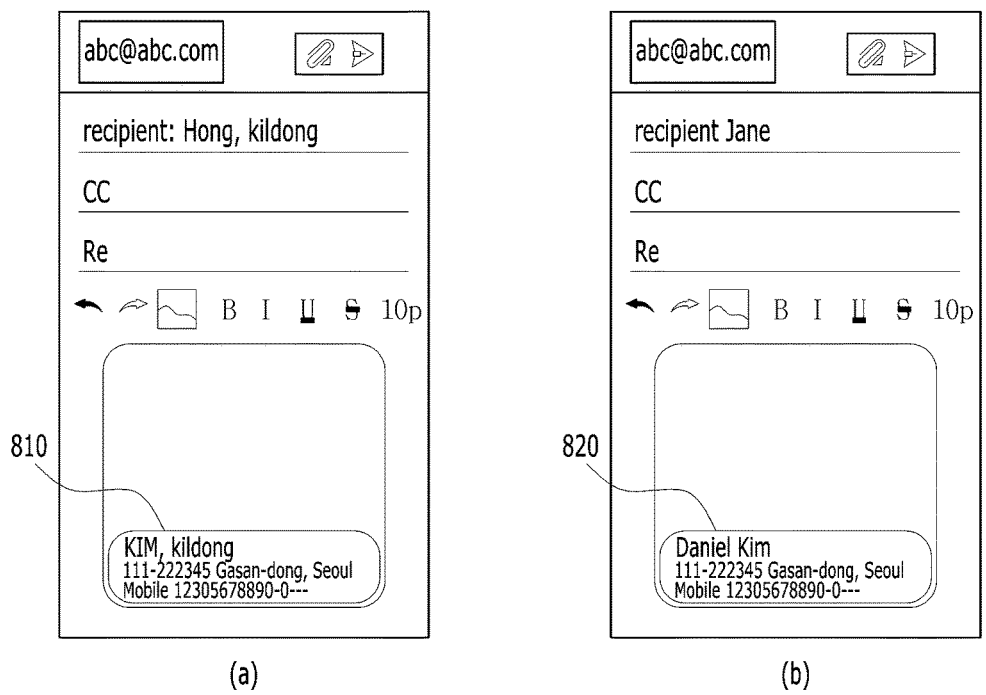

For example, as shown in (a) of FIG. 8C, if a recipient of Korean name is input to the recipient input area, the controller 180 may insert the signature 810 drafted in Korean language to the body text area. Unlike this, as shown in (b) of FIG. 8C, if a recipient of English name is input to the recipient input area, the controller 180 may insert the signature 820 drafted in English to the body text area.

As shown in FIGS. 8A to 8C, the controller 180 may control the signature, which will be inserted to the body text area, based on the user input, or may automatically determine a signature suitable for an email drafting status.

The user may set importance of an email which is being drafted. At this time, if importance of the email which is being drafted is high, the controller 180 may display a writing input by the user on a signature area instead of the previously registered signature.

Figure 8D:
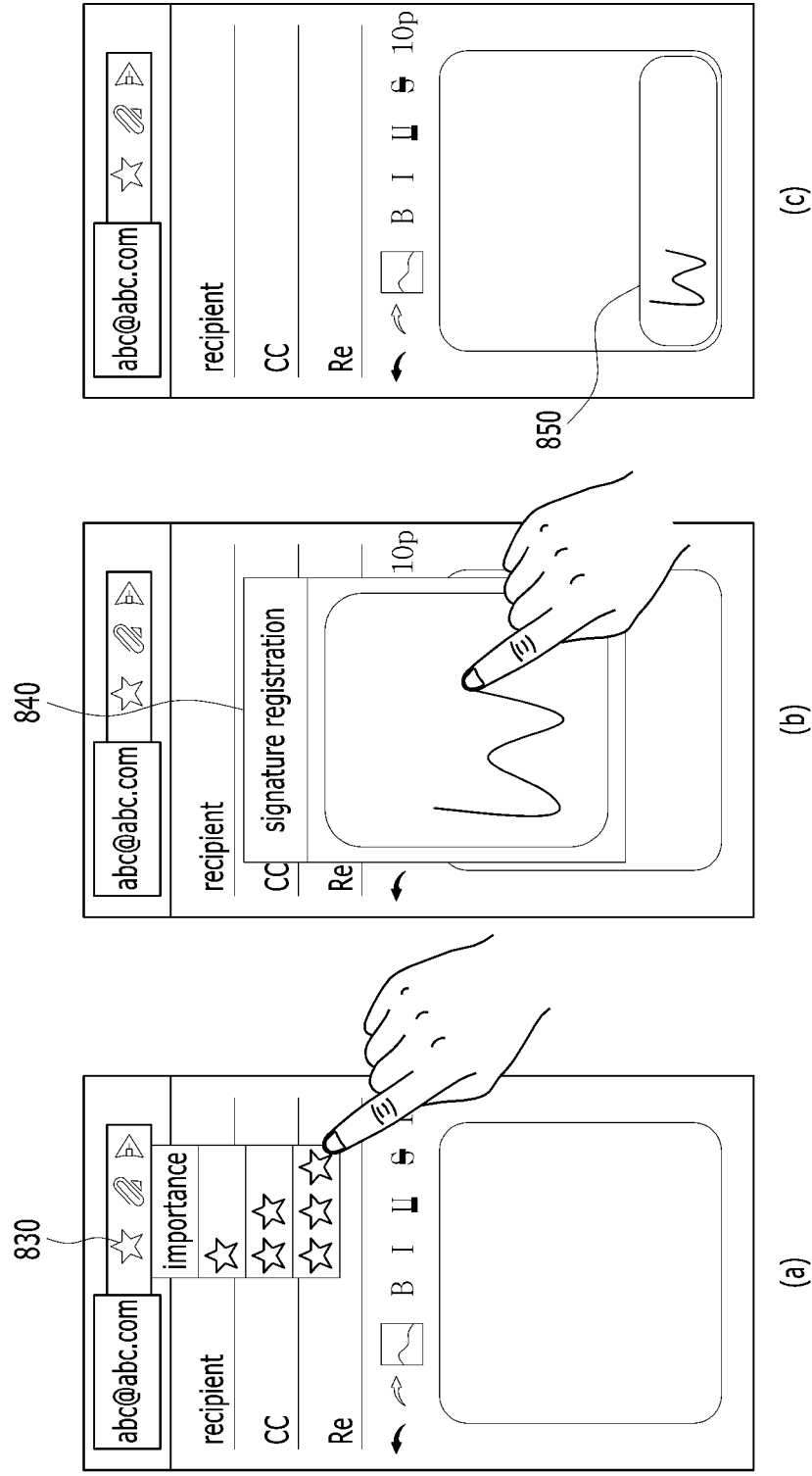

For example, as shown in (a) of FIG. 8D, if a button 830 for setting importance is touched and importance of the email is set at a predetermined level or more, the controller 180 may display a writing input window 840 for inputting a writing from the user as shown in (b) of FIG. 8D. Afterwards, the controller 180 may display a writing drawn along a trace of a touch input for the writing input window 840 on the signature area 850 as shown in (C) of FIG. 8D.

The controller 180 may determine a format of a text input to the body text area based on the user input for a button for controlling the format displayed through the email drafting screen. At this time, if a pointer which touches a format button is dragged to a specific text or if a text is selected in a state that the format button is selected, the controller 180 may change the format of the selected text in accordance with an attribute of the format button. This detailed description will be understood with reference to FIGS. 9A and 9B.

Figure 9A:
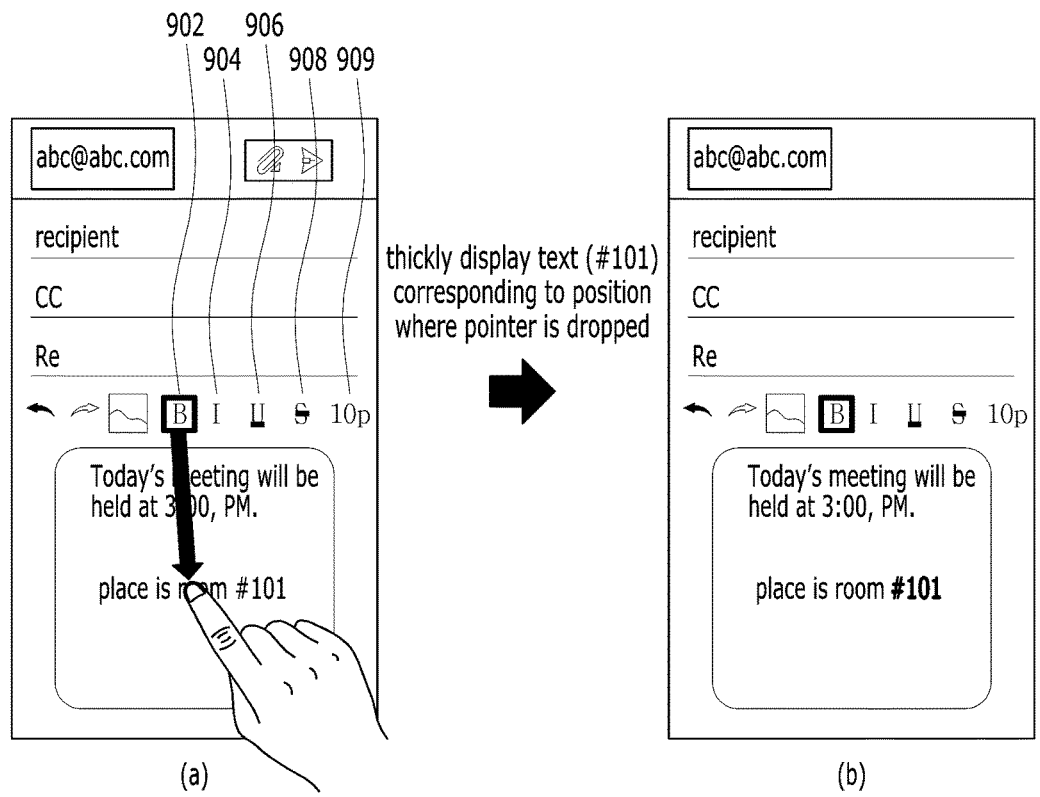
FIGS. 9A and 9B are views illustrating examples that a format of a text is changed.
Figure 9B:
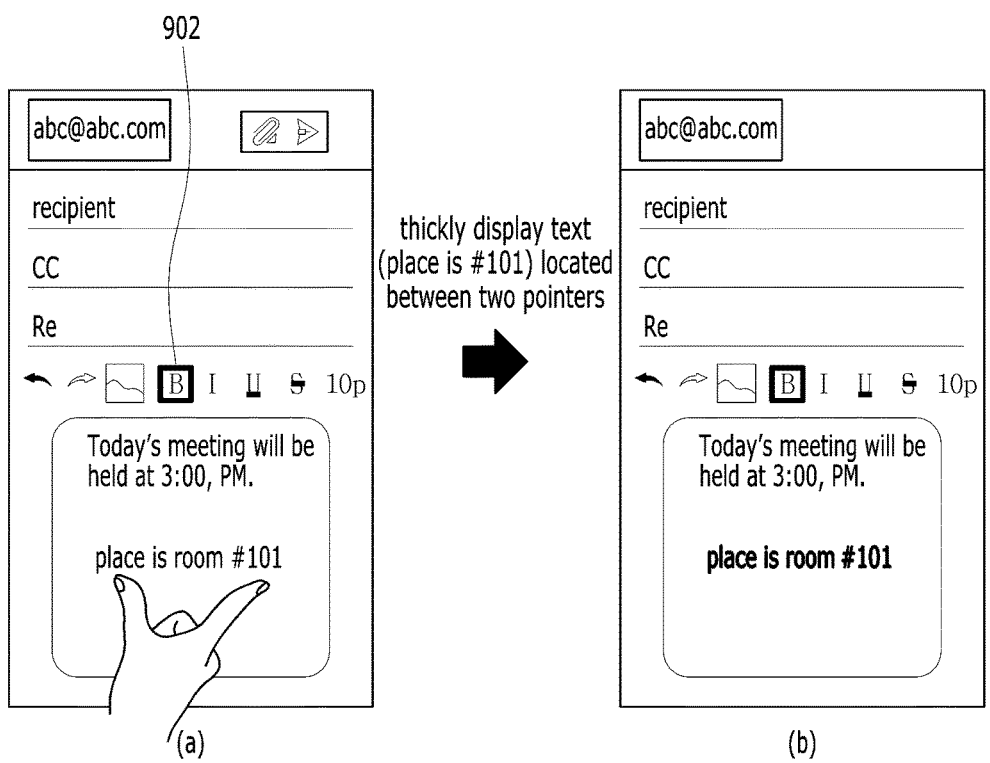

FIGS. 9A and 9B are views illustrating examples that a format of a text is changed. For convenience of description, a bold button 902 for changing a text to a thick thickness, an italic button 904 for inclining a text to any one side, an underline button 906 for drawing an underline on a text, a strike-out button 908 for drawing a strike-out on a text, and a font size control button 909 for controlling a font size of a text are displayed on the email drafting screen.

As shown in (a) of FIG. 9A, if the pointer which touches the bold button 902 is dragged to a specific text within the body text area, the controller 180 may change the text indicated by the pointer to a thick thickness as shown in (b) of FIG. 9A.

For another example, as shown in (a) of FIG. 9B, in a state that the bold button 902 is selected, if a text on the body text area is selected by a touch input of the user, the controller 180 may change the selected text to a thick thickness as shown in (b) of FIG. 9B. The user input for selecting the text on the body text area may indicate that two pointers touch the body text area. In this case, any one of the two pointers may indicate a start position of the text selection, and the other one may indicate an end position of the text selection. For example, in the example shown in (a) of FIG. 9B, a thumb may indicate a start position for the text selection, and a forefinger may indicate an end position for the text selection.

Although the format change of the text has been described based on the bold button 902 as an example in FIGS. 9A and 9B, the aforementioned example may equally be applied to the case that the italic button 904, the underline button 906, the strike-out button 908 and the font size control button 909 are selected.

An undo button for cancelling a command which is recently performed may be provided to the email drafting screen. If the undo button is touched, the controller 180 may cancel the command which is recently performed. At this time, the controller 180 may simultaneously cancel a plurality of commands which are recently performed, in accordance with a user input. This detailed description will be understood with reference to FIGS. 10A and 10B.

Figure 10A:
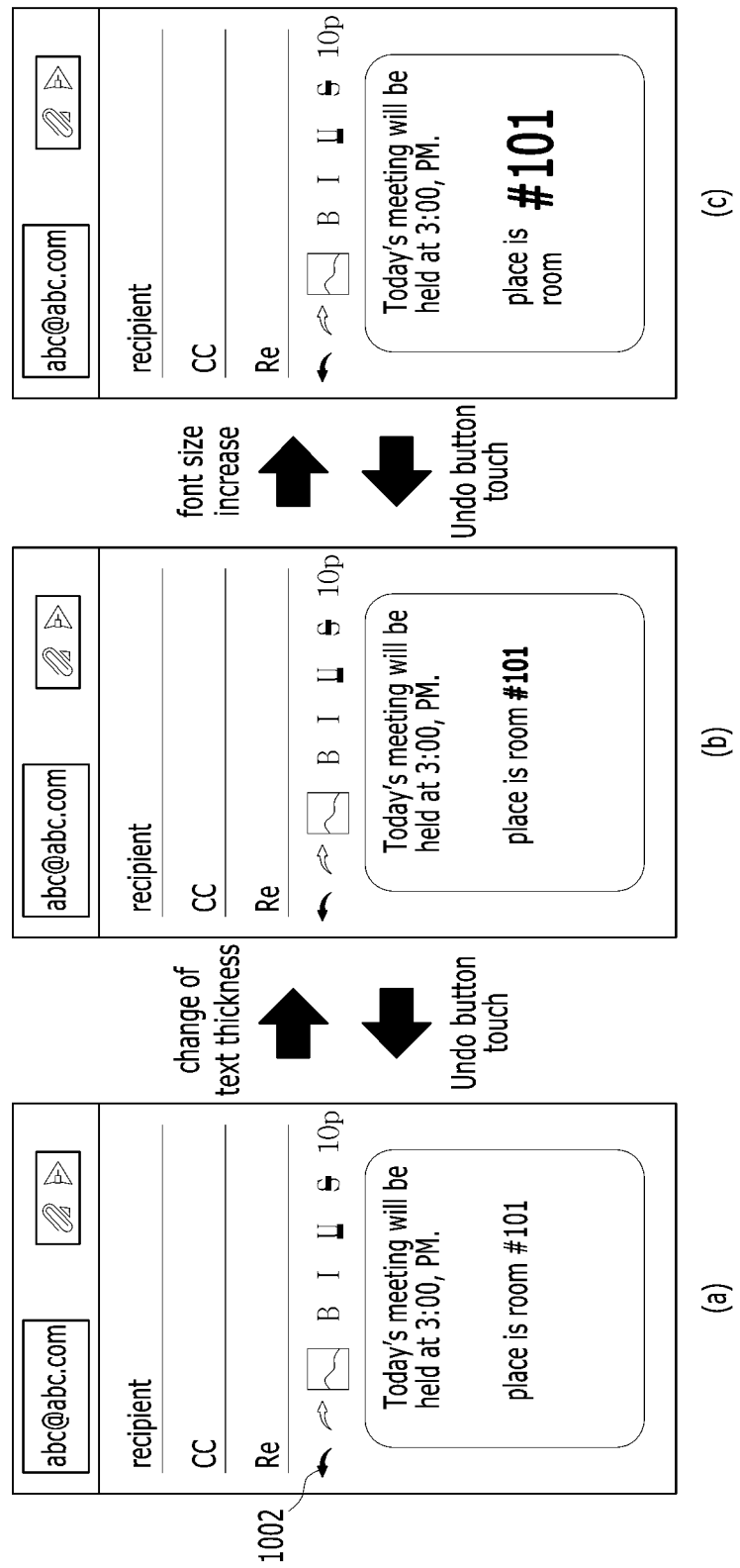

FIGS. 10A and 10B are views illustrating examples that a command which is recently performed is cancelled. For convenience of description, as shown in (a) to (c) of FIG. 10A, it is assumed that a command for initially inputting a text is performed, a command for changing a part of a text to a thick thickness is performed, and then a command for increasing a font size of a part of a text is performed.

If an undo button 1002 is touched, the controller 180 may sequentially cancel the commands which are recently performed. For example, if the undo button 1002 is touched once, the controller 180 may cancel the command for increasing a font size to become the state shown in (b) of FIG. 10A, and if the undo button 1002 is touched once more, the controller 180 may cancel the command for changing a part of a text to a thick thickness to become the state shown in (a) of FIG. 10A.

The controller 180 may simultaneously cancel the plurality of commands based on the user input for the undo button 1002. For example, in a state that the undo button 1002 is touched, if a new pointer touches a touch screen, the number of commands which will be cancelled may be determined based on the distance where the new pointer is dragged.

For example, as shown in (a) of FIG. 10B, in a state that a thumb touches the pointer, if a forefinger is rotated clockwise as much as a first distance, the controller 180 may cancel only one command. In (a) of FIG. 10B, the command for increasing a font size is cancelled.

If a forefinger is rotated as much as a second distance longer than the first distance, the controller 180 may simultaneously cancel two commands. In (b) of FIG. 10B, the command for increasing a font size and the command for changing a part of a text to a thick thickness are simultaneously cancelled.

Although not shown, if a forefinger is rotated as much as a third distance longer than the second distance, the controller 180 may simultaneously cancel three commands. For example, if the forefinger is rotated as much as the third distance, the controller 180 may simultaneously cancel the command for increasing a size, the command for thickly making a part of a text and the command for inputting a text.

If the pointer designates a specific area, the controller 180 may cancel a command applied to the specific area. This detailed description will be understood with reference to FIGS. 11A and 11B.

Figure 11A:
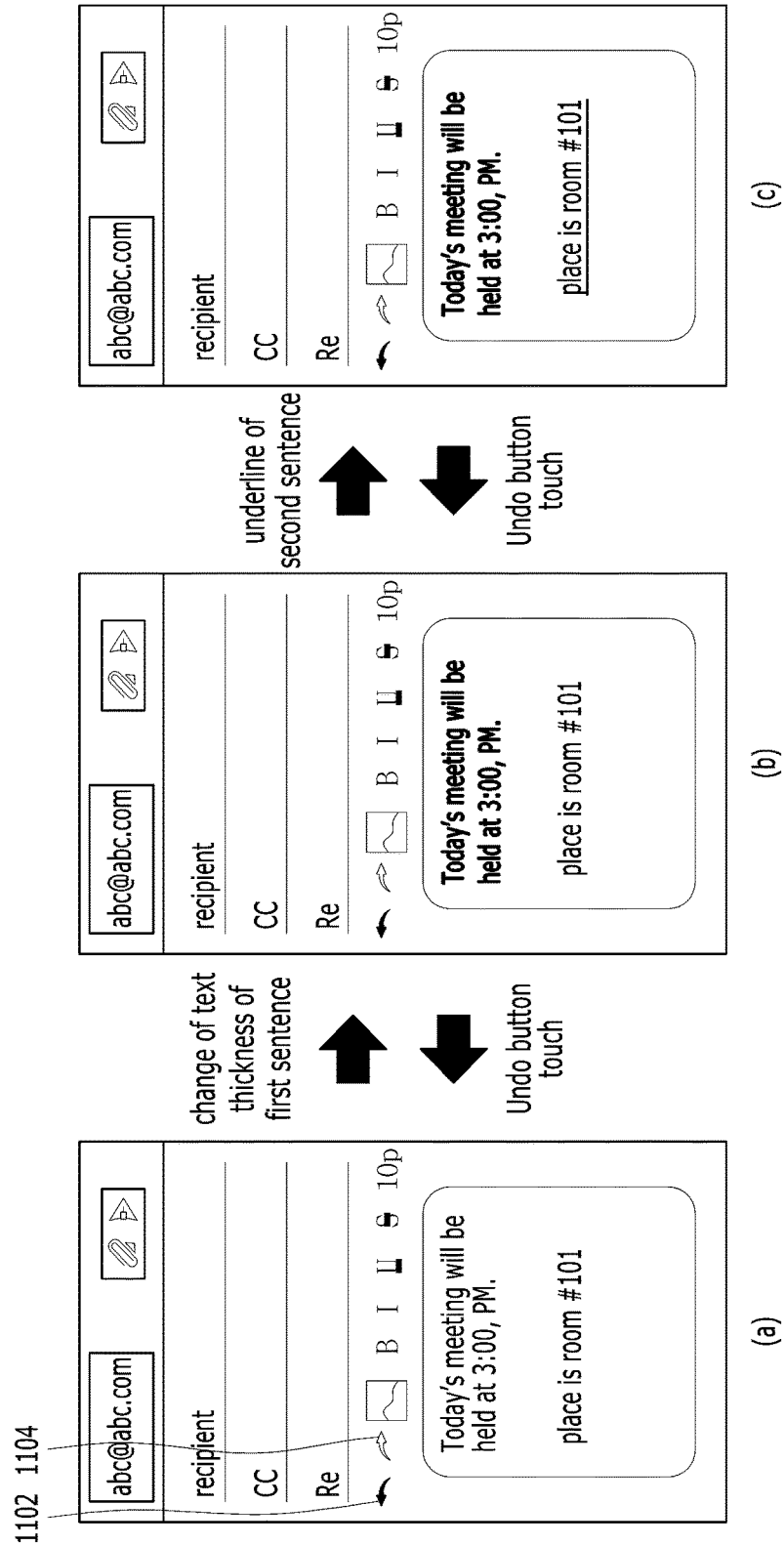

FIGS. 11A and 11B are views illustrating examples that a command applied to a specific area is cancelled. For convenience of description, as shown in (a) to (c) of FIG. 11A, it is assumed that a command for thickly making a text of a first sentence of the body text area and then a command for drawing an underline on a text of a second sentence of the body text area is performed.

The controller 180 may determine a command which will be cancelled, in accordance with a drag position of a pointer which touches an undo button 1102. For example, as shown in (a) of FIG. 11B, if the pointer is dragged to the first sentence of the body text area, the controller 180 may cancel the command (that is, command for thickly making a text) finally applied to the first sentence.

For another example, as shown in (b) of FIG. 11B, if the pointer is dragged to the second sentence of the body text area, the controller 180 may cancel the command (that is, command for drawing an underline) finally applied to the second sentence.

As shown in FIGS. 11A and 11B, the controller 180 may cancel the command finally applied to the area indicated by the pointer.

A redo button for recovering the command cancelled by the undo button 1102 may be provided to the email drafting screen. If the redo button 1104 is touched, the controller 180 may recover the command cancelled as the undo button 1102 is selected. Also, the controller 180 may simultaneously recover the plurality of commands based on the user input for the redo button 1104 by using a bar described through FIG. 10B, or may recover the command for a specific area by using a bar described through FIGS. 11A and 11B.

For another example, the mobile terminal 100 according to the present invention may implement an undo function and a redo function by using one button. In more detail, if the pointer is rotated clockwise (or counterclockwise) in a state that the button is touched, the mobile terminal 100 may perform an undo function for canceling the command which is recently performed, and if the pointer is rotated counterclockwise (or clockwise) in a state that the button is touched, the mobile terminal 100 may perform a redo function for re-executing the command which is recently canceled.

The undo function may be applied while the email is being drafted, and may be used to recover a deleted email. For example, if any one of the list of emails is selected and the undo button 1102 is touched after the selected email is deleted, the controller 180 may recover the deleted email. To this end, the controller 180 may temporarily store the email, which is to be deleted, without completely deleting the email, even though a user input for deleting the email is input.

The mobile terminal 100 according to the present invention may output a mini-window, which includes additional information for convenience of a user, to the email drafting screen. This detailed description will be understood with reference to FIGS. 12A to 12C.

Figure 12A:
FIGS. 12A to 12C are views illustrating examples that a mini-window is output.
Figure 12A:
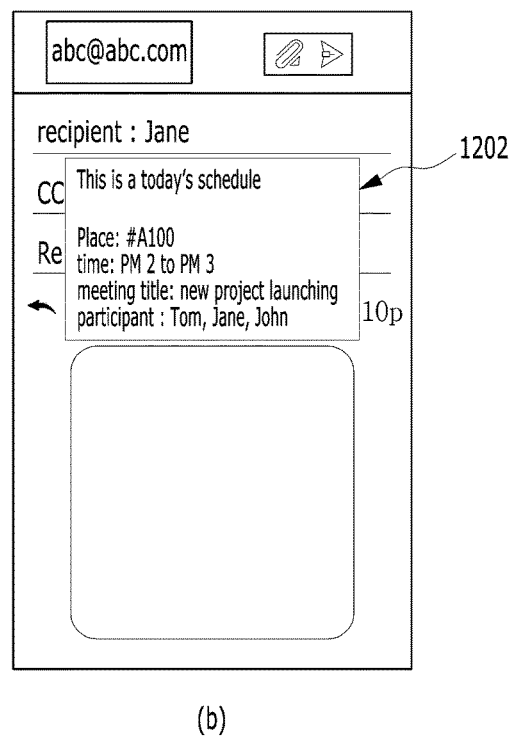
Figure 12B:
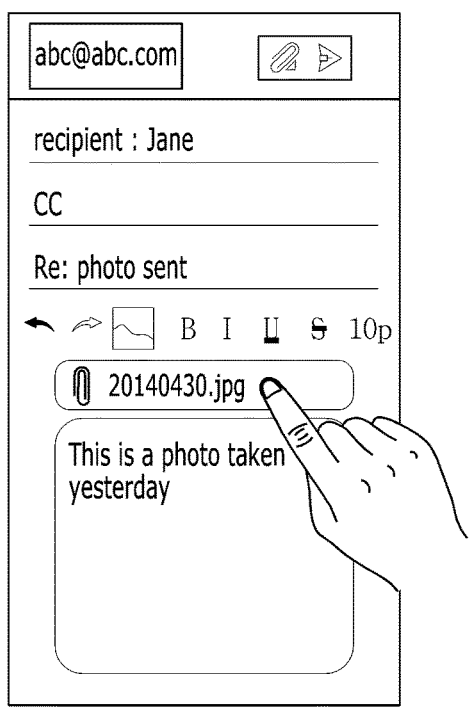
Figure 12B:
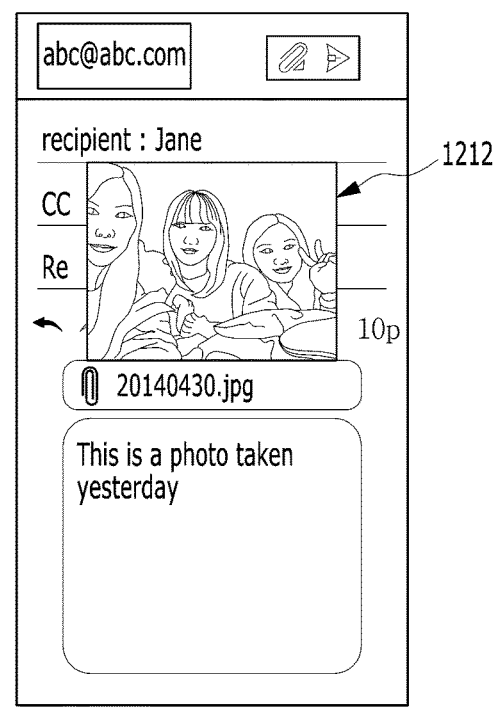
Figure 12C:
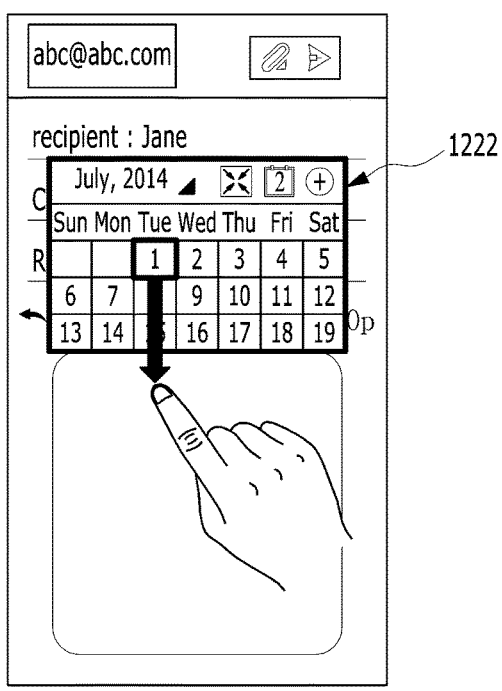
Figure 12C:
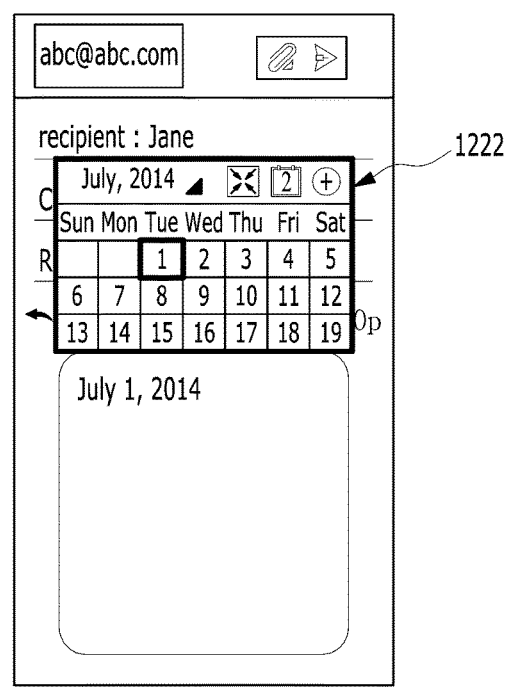

FIGS. 12A to 12C are views illustrating examples that a mini-window is output.

If the email drafting screen is output to draft an answer to a predetermined email, the controller 180 may output a mini-window 1202 and output a content of a predetermined email through the mini-window 1202. For example, as shown in (a) of FIG. 12A, if a user input for answering to the predetermined email is received while details of the predetermined email are being displayed, the controller 180 may output the email drafting screen for drafting the answer as shown in (b) of FIG. 12A. At this time, as shown in (b) of FIG. 12A, the controller 180 may display the mini-window 1202, which includes a content of the predetermined email, on the email drafting screen. Therefore, the user may conveniently draft the email while checking the content included in the predetermined email.

If an attached file which will be attached to the email is selected, the controller 180 may display a list of attached files attached to the email, as shown in (a) of FIG. 12B. Afterwards, if the attached file on the list of attached files is touched, the controller 180 may output a preview image of the attached file through the mini-window 1212 as shown in (b) of FIG. 12B.

In accordance with a user request while the email is being drafted, the controller 180 may display a mini-window 1222, which includes a calendar, as shown in (a) of FIG. 12C. At this time, if any one date of the calendar included in the mini-window 1222 is selected and the selected date is dragged to the body text area, the controller 180 may insert a text corresponding to the selected date to the dragged position.

A position and a size of the mini-window shown in FIGS. 12A to 12C may be controlled by the user input. Moreover, to prevent the mini-window from covering the email drafting screen, the mini-window may be semi-transparent, or transparency of the mini-window may be controlled by the user input.

A conference mail that may add a new schedule may be applied to the mobile terminal 100 according to the present invention. The conference mail may be an email of a new format, which adds a new schedule and suggests an opposite party who receives a mail, to add a new schedule. The conference mail will be described with reference to the following drawings.

Figure 13A:
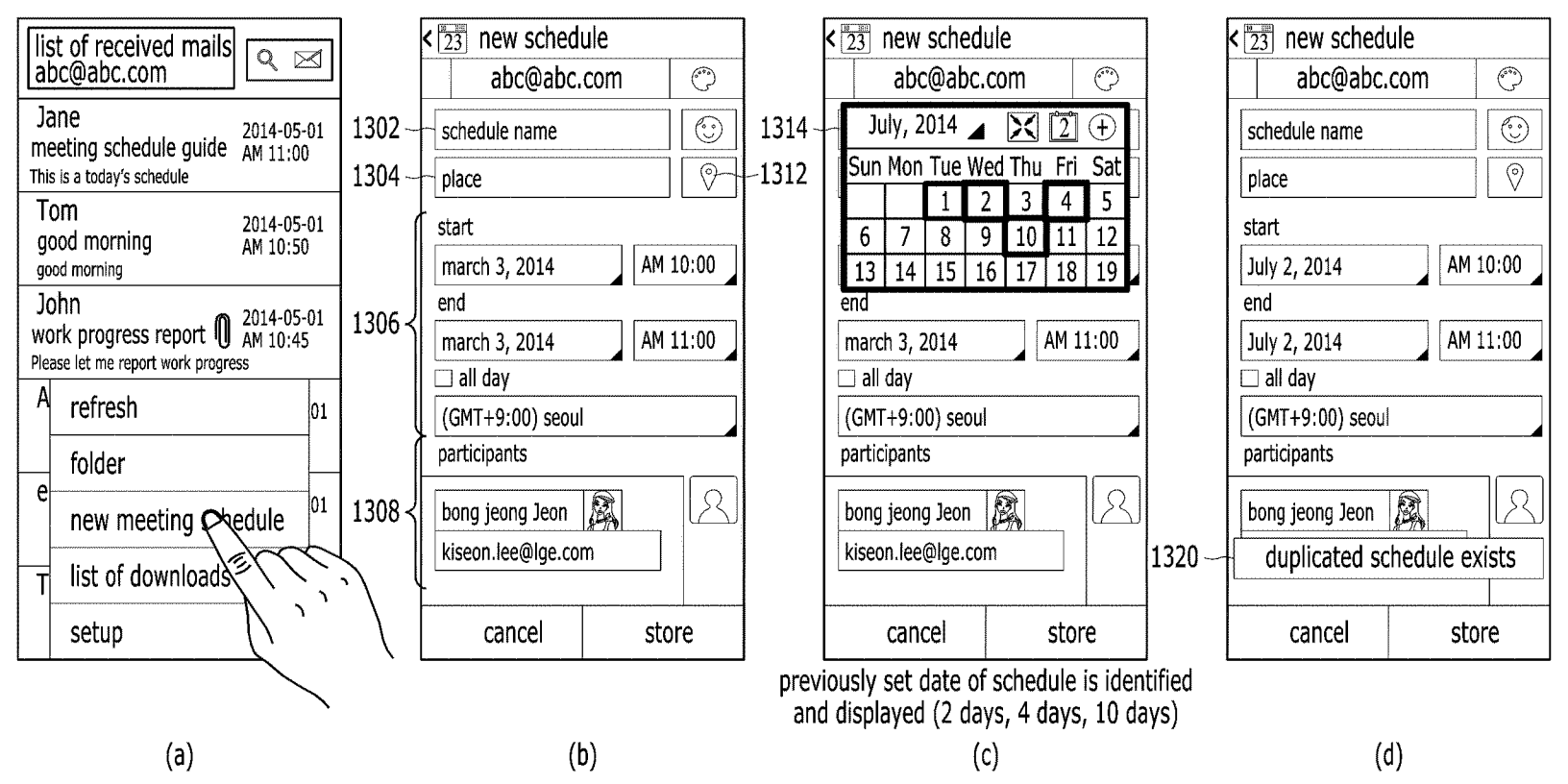
Figure 13B:
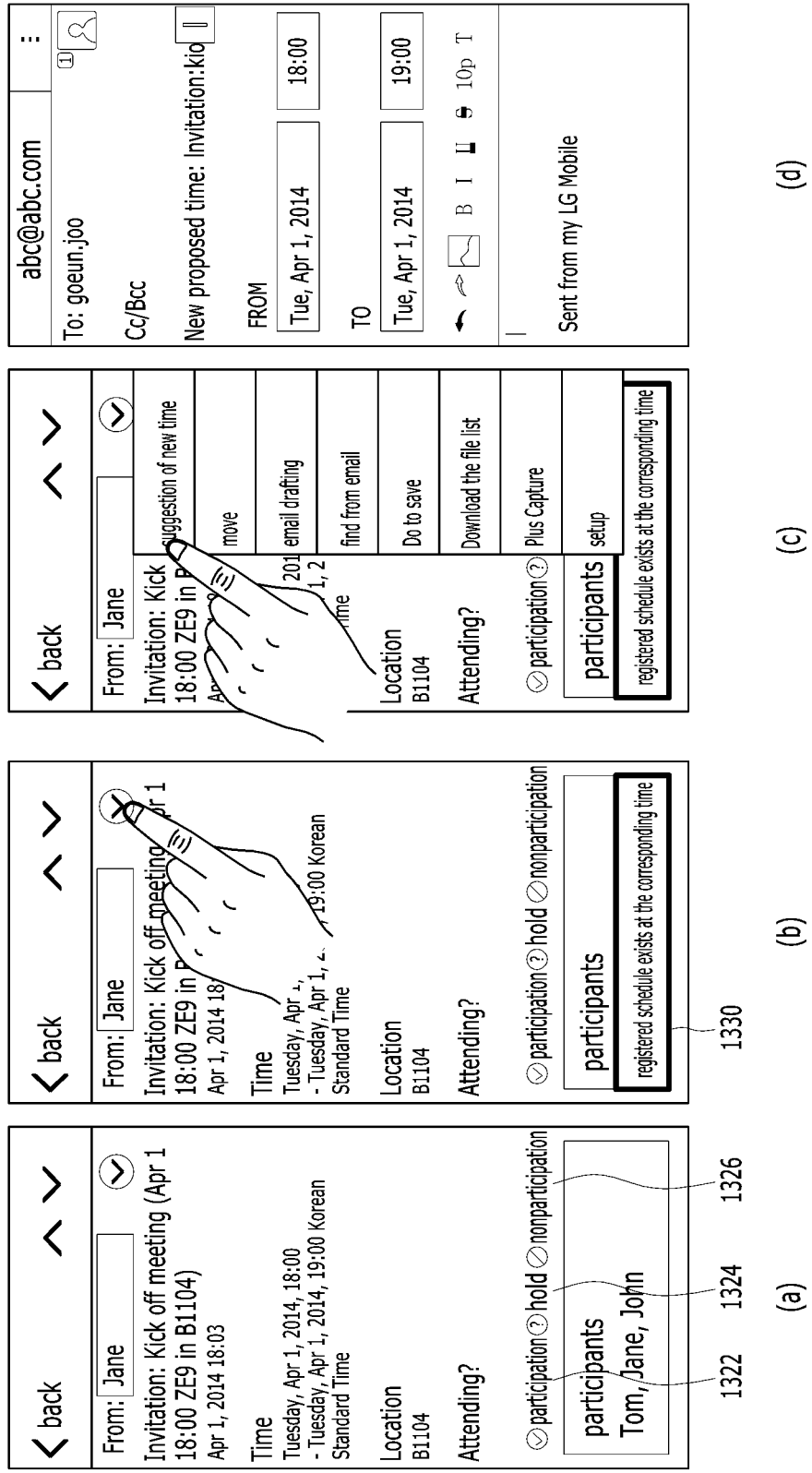

FIGS. 13A and 13B are views illustrating a drafting screen of a conference mail.

FIG. 13A is a view illustrating a user interface (UI) provided to a user during transmission of a conference mail.

As shown in (a) of FIG. 13A, in a state that an email application is executed, if a user input for inputting a new schedule is received, the controller 180 may display a conference mail drafting screen for drafting a conference mail as shown in (b) of FIG. 13A.

The conference mail drafting screen may include at least one of a title 1302 of a schedule to be newly added, a place 1304, a time 1306, an area 1308 for inputting a participant, and a body text area (not shown) for inputting a body text message.

A text input to the title 1302 of the schedule may be set to a title of an email during later transmission of the email.

A map button 1312 associated with a map application may be displayed in the periphery of the place input area 1304. If the map button 1312 is touched, the controller 180 may display a map, and if a specific position on the map is selected, the controller 180 may input the selected position to the place input area.

A date when the schedule will start and time information may be input to the time input area 1306. The time input area may include a start time input area for inputting a start time of the schedule and an end time input area for inputting an end time of the schedule as shown in (b) of FIG. 13A.

If the time input area 1306 is touched, the controller 180 may output a mini-window 1314, which includes a calendar, as described above through FIG. 12C. If a specific date is selected from the mini-window, the selected date may be inserted to the time input area.

At this time, the controller 180, as shown in (c) of FIG. 13A, may display a date corresponding to a registered schedule to be visually identified on the calendar output through the mini-window 1314. If a schedule of participants who are desired to invite the schedule is perceived, the controller 180 may display a date corresponding to a schedule of the other participants to be visually identified.

If a previously registered schedule exists in the time set through the time input area 1306, the controller 180 may output a message 1320 indicating that the previously registered schedule exists in the set time, as shown in (d) of FIG. 13A.

Participants who are desired to invite the schedule may be input to the participant input area 1308. Identification information of a participant such as a name of an opposite party who desires to attend the schedule and an email address of the opposite party who desires to attend the schedule may be input to the participant input area 1308. Of course, a plurality of participants may be input to the participant input area 1308.

Information to be additionally transferred, in addition to a meeting place, a schedule and a participant, may be input to the body text input area (not shown) when an email is transmitted.

Afterwards, if a user input for transmitting an email is received, the controller 180 may transmit the email to an opposite party input to the participant input area 1308. A text input to the title input area 1302 of the conference mail drafting screen may be set to a title of the email If the conference email is transmitted, the controller 180 may add a schedule of a user to the time set through the conference mail.

Next, if the conference mail is received, a UI provided to the user will be described.

FIG. 13B is a view illustrating a UI provided to a user when the conference mail is received. Information on a place where the schedule will be performed and time when the schedule will be performed may be included in the body text of the conference mail.

Also, buttons for selecting whether the corresponding user may attend the schedule may be included in the body text of the conference mail. In (a) of FIG. 13B, an attendance button 1322, a hold button 1324, and a rejection button 1326 are included.

In (a) of FIG. 13B, if the attendance button 1322 is selected, the controller 180 may automatically transmit an answer mail for indicating that the corresponding user can attend the schedule, to the opposite party who has transmitted the conference mail. Moreover, the controller 180 may add the schedule of the user to the time indicated by the conference mail.

In (a) of FIG. 13B, if the rejection button 1326 is selected, the controller 180 may automatically transmit an answer mail for indicating that the corresponding user cannot attend the schedule, to the opposite party who has transmitted the conference mail.

In (a) of FIG. 13B, if the hold button 1324 is selected, a procedure of transmitting an answer mail to the opposite party who has transmitted the conference mail may be omitted.

The controller 180 may display a message 1330 for guiding whether a previously registered schedule exists in the time designated by the conference mail as shown in (b) of FIG. 13B to easily check whether the user can attend the schedule.

If the user cannot attend the suggested schedule, the user may suggest to change the time or place of the suggested schedule. For example, in a menu shown in (c) of FIG. 13B, if 'a new suggestion' area is touched, the controller 180 may display the conference mail drafting screen as shown in (d) of FIG. 13B.

At this time, an idiom (for example, text string such as 'New Proposal') for identifying that an email which is being drafted is to propose a suggestion corrected to correspond to the existing conference mail may automatically be inserted to the title input area of the conference mail drafting screen.

If the place or time indicated by the existing conference mail is changed, the controller 180 may highlight the changed place or the changed time and transmit the highlighted place or time.

The UI that may be applied to the mobile terminal 100 of the present invention has been described in detail with reference to FIGS. 2 to 13. Hereinafter, based on the aforementioned description, the mobile terminal 100, which may highlight information related to a recipient or sender when an email is transmitted or received, will be described in detail.

When an email is drafted or details of the email which is received or transmitted are displayed, if information related to an opposite party of the email is searched, the mobile terminal 100 according to the present invention may highlight the searched content. In this case, the opposite party of the email may include at least one of a target recipient configured to receive an email which is being drafted, a target sender who has transmitted the received email, and a target recipient who has received the transmitted email.

Hereinafter, the mobile terminal 100 according to the present invention will be described in detail with reference to an operation flow chart which will be described later.

Figure 14:
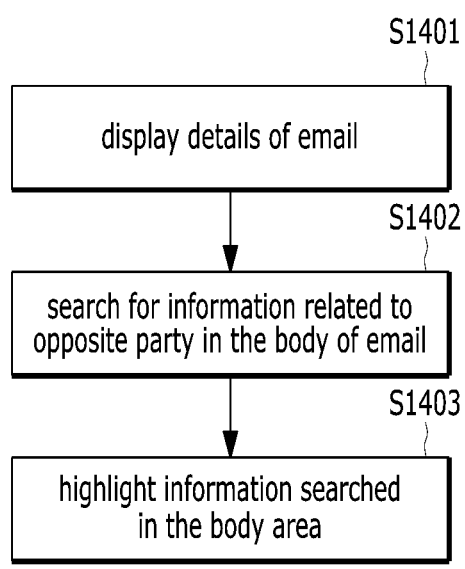
FIG. 14 is a flow chart illustrating an operation of a mobile terminal according to the present invention.

FIG. 14 is a flow chart illustrating an operation of a mobile terminal according to the present invention. Referring to FIG. 14, the controller 180 may display an email drafting screen or details of an email which is received or transmitted, based on a user input (S1401).

Afterwards, the controller 180 may search whether information related to an opposite party of the email is included in the body text of the email (S1402). In this case, the information related to the opposite party may include a name of the opposite party, account information (for example, email address of the opposite party, nickname on SNS, etc.) of the opposite party, a phone number of the opposite party, a position of the opposite party, a group to which the opposite party belongs, and a face of the opposite party.

If the information related to the opposite party of the email is searched from the body text of the email, the controller 180 may highlight searched information within the body text area of the email (S1403). If the searched information is a text, the controller 180 may highlight the searched text by controlling (for example, thickly displaying the searched text, increasing a font size of the searched text, or changing a color of the searched text) a format of the searched text. If the searched information is an image, the controller 180 may highlight the searched image by displaying an area corresponding to the opposite party within the searched image to be visually identified.

Figure 15A:
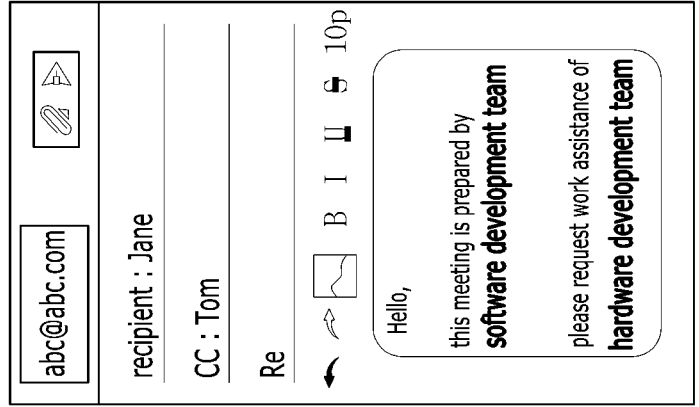
FIGS. 15A to 15C are views illustrating examples that searched information is highlighted.
Figure 15A:
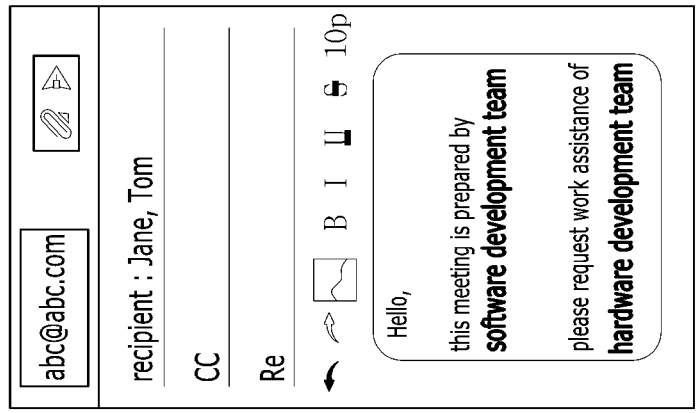
Figure 15A:
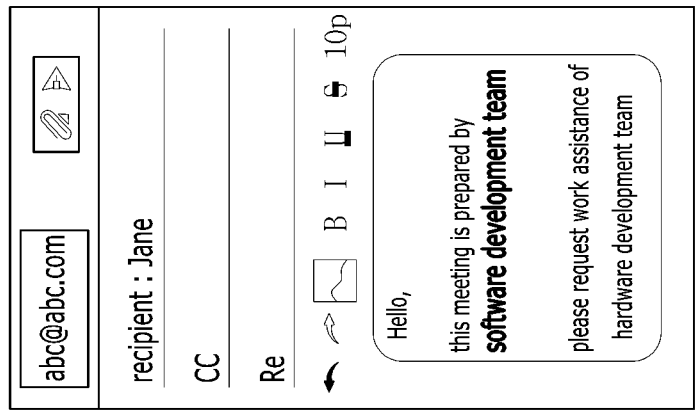
Figure 15B:
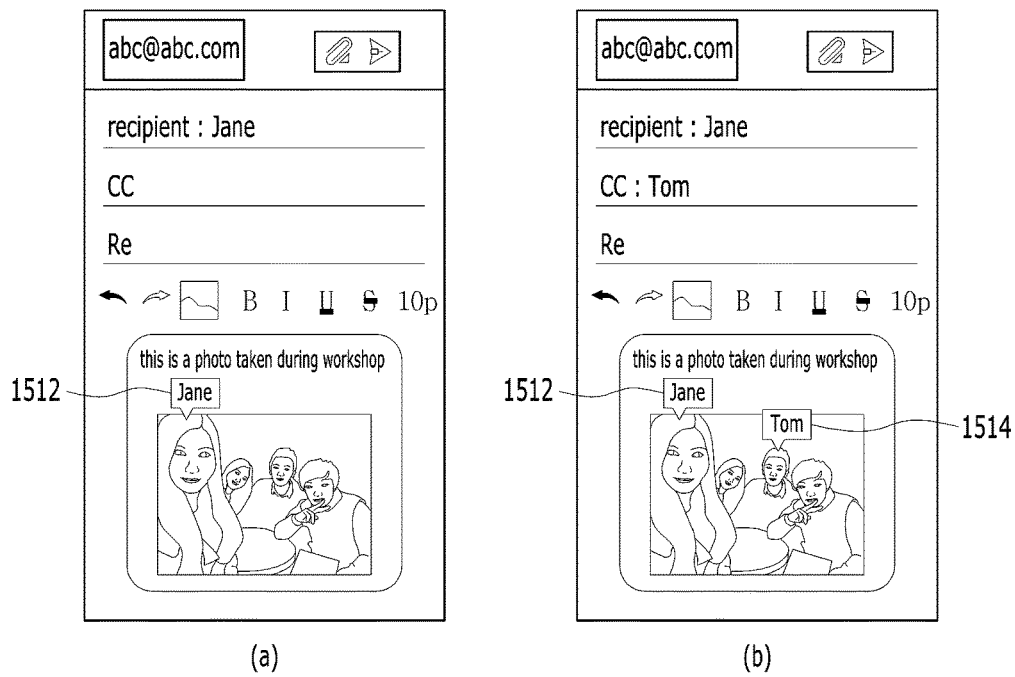

An example that the searched information is highlighted will be described with reference to FIGS. 15A to 15C. FIG. 15A is a view illustrating that searched information is a text, and FIG. 15B is a view illustrating that information on an opposite party is searched from an image. For convenience of description, it is assumed in FIGS. 15A to 15C that an email drafting screen is output.

If a target recipient of an email is input to the recipient input area or the referrer input area, the controller 180 may search whether the information related to the input target recipient exists in contents included in the body text area. If the information related to the input target recipient exists, the controller 180 may highlight the searched information. For example, if a character name 'Jane' is input to the recipient input area and Jane belongs to a software development team, the controller 180 may highlight a text corresponding to the software development team as shown in (a) of FIG. 15A. An increased font size and thickness of the text indicating 'software development team' within the body text area are illustrated in (a) of FIG. 15A.

If a new target recipient is additionally input to the recipient input area or the referrer input area, the controller 180 may highlight information related to the additionally input target recipient. For example, if a character name 'Tom' is additionally input to the recipient input area and Tom belongs to a hardware development team, the controller 180 may highlight a text corresponding to the hardware development team as shown in (b) of FIG. 15A. An increased font size and thickness of the text indicating 'hardware development team' within the body text area are illustrated in (b) of FIG. 15A.

The controller 180 may control information related to each target recipient to be visually identified. For example, if recipients Jane and Tom are input to the recipient input area, the controller 180 may display the information related to Jane as a first color and the information related to Tom as a second color within the body text area.

The controller 180 may control a highlighted level to be varied depending on a position of a target recipient of an email. In more detail, the controller 180 may control information related to a character designated as a recipient to be more highlighted than information related to a character designated as a referrer. In more detail, the controller 180 may determine whether to display a text to be more highlighted using a font size, a thickness and an underline.

For example, as shown in (c) of FIG. 15A, if Jane is input to the recipient input area and Tom is input to the referrer input area, the controller 180 may highlight both information related to Jane and information related to Tom and display the information related to Jane to be more highlighted than the information related to Tom. In (c) of FIG. 15A, a font size of the text indicating 'software development team' corresponding to the information related to Jane is greater than a font size of the text indicating 'text development team' corresponding to the information related to Tom.

If information (for example, face of opposite party) related to an opposite party is searched from an image included in the body text area of an email, the controller 180 may control the information related to an opposite party to be visually identified on the image. For example, as shown in (a) of FIG. 15B, if Jane is input to the recipient input area and a face of Jane is searched from the image inserted to the body text area, the controller 180 may highlight the face of Jane within the image. In (a) of FIG. 15B, an indicator 1512 indicating Jane is output to the periphery of the face of Jane within the image, whereby the face of Jane is highlighted.

If a plurality of target recipients are input and a face of each of the plurality of target recipients is included in the image, the controller 180 may highlight the face of each of the plurality of target recipients. For example, as shown in (b) of FIG. 15B, if Jane and Tom are input to the recipient input area and the referrer input area and faces of Jane and Tom are searched from the image inserted to the body text area, the controller 180 may highlight the face of Jane and the face of Tome within the image. In (b) of FIG. 15B, an indicator 1512 indicating Jane is output to the periphery of the face of Jane and an indicator 1514 indicating Tom is output to the periphery of the face of Tom.

If all contents input to the body text area cannot be displayed on one screen, the user can check contents which are not displayed on the screen by scrolling the body text area. If the information related to the target recipient is searched from the content newly displayed on the screen as the body text area is scrolled, the controller 180 may output a feedback indicating that the information related to the target recipient has been searched, while highlighting the searched information.

Figure 15C:
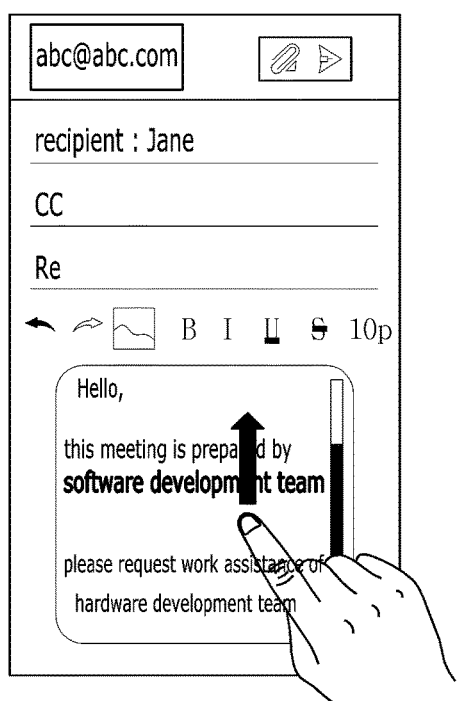
Figure 15C:
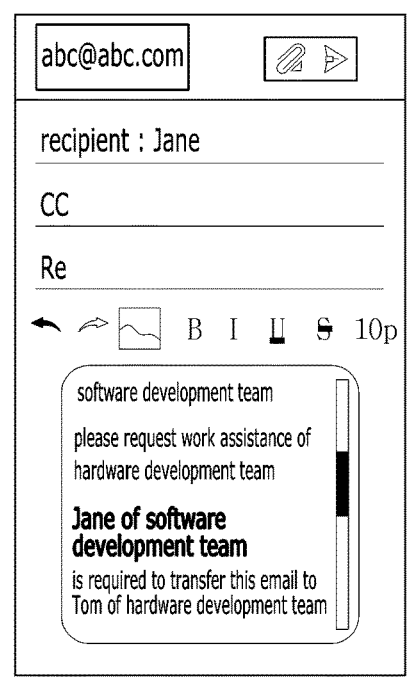

For example, as shown in FIG. 15C, if a user input for downwardly scrolling the body text area is received, the controller 180 may display the new content by downwardly scrolling the body text area. At this time, if a text string indicating 'software development team' indicating a group which Jane belongs is searched from the newly displayed content, the controller 180 may highlight the text string indicating 'software development team'. Moreover, the controller 180 may output a feedback to indicate that the information related to the target recipient has been searched. The feedback may include at least one type of vibration, sound and light.

If a text string indicating 'Jane', which indicates the name of the target recipient, is searched as the body text area is continuously scrolled, the controller 180 may output a feedback to indicate that the information related to the target recipient has been searched, while highlighting the searched text string.

In (b) of FIG. 15C, the text strings indicating 'software development team' and 'Jane' among contents newly displayed by scrolling of the body text area are highlighted.

If the information related to the target recipient among the newly displayed contents is searched, the controller 180 may temporarily stop scrolling, or may lower a scroll moving speed of the body text area. This is to allow the user to easily check the content related to the target recipient from the newly displayed contents. Although FIGS. 15A and 15B exemplarily illustrate the email drafting screen, the aforementioned matters may be applied while details of the received email are being displayed or details of the transmitted email are being displayed.

In this case, the details of the received email and the transmitted email may be displayed on the entire screen as described with reference to FIGS. 2A and 2B, or may be displayed in a card type as described with reference to FIGS. 4A to 4D.

The mobile terminal 100 according to the present invention may highlight information related to a designated opposite party only if the opposite party is designated by a touch input.

Figure 16:
FIG. 16 is a view illustrating an example that information related to an opposite party designated by a touch input of a user is highlighted.
Figure 16:

For example, FIG. 16 is a view illustrating an example that information related to an opposite party designated by a touch input of a user is highlighted. For convenience of description, it is assumed in FIG. 16 that details of a received email are being output.

While the details of the received email are being output, a specific opposite party may be selected by a touch input of the user. If the specific opposite party is selected, the controller 180 may highlight information related to the specific opposite party within the body text area of the email.

For example, as shown in (a) of FIG. 16, if a user input for touching a character 'Jane' who has transmitted the email is received, the controller 180 may highlight information related to the character 'Jane'. In (a) of FIG. 16, a text indicating 'software development team' to which Jane belongs is highlighted.

If a user input for touching a character 'Tom' who is a referrer of the email is received as shown in (b) of FIG. 16, the controller 180 may highlight information related to the character 'Tom'. In (b) of FIG. 16, a text indicating 'hardware development team' to which Tom belongs is highlighted.

Although FIG. 16 exemplarily illustrates that the details of the email are displayed, the aforementioned matters may be applied while a new email is being drafted.

Moreover, although FIG. 16 illustrates that the details of the email are displayed on the entire screen, the aforementioned matters may be applied as they are even in the case that the details of the email are displayed in a card type as described with reference to FIGS. 4A to 4D.

Although a user gives a predetermined opposite party a phone call, if the predetermined opposite party does not answer the phone call, the mobile terminal 100 according to the present invention may activate voice recording and automatically transmit the recorded voice to the opposite party. This detailed description will be understood with reference to FIG. 17.

Figure 17:
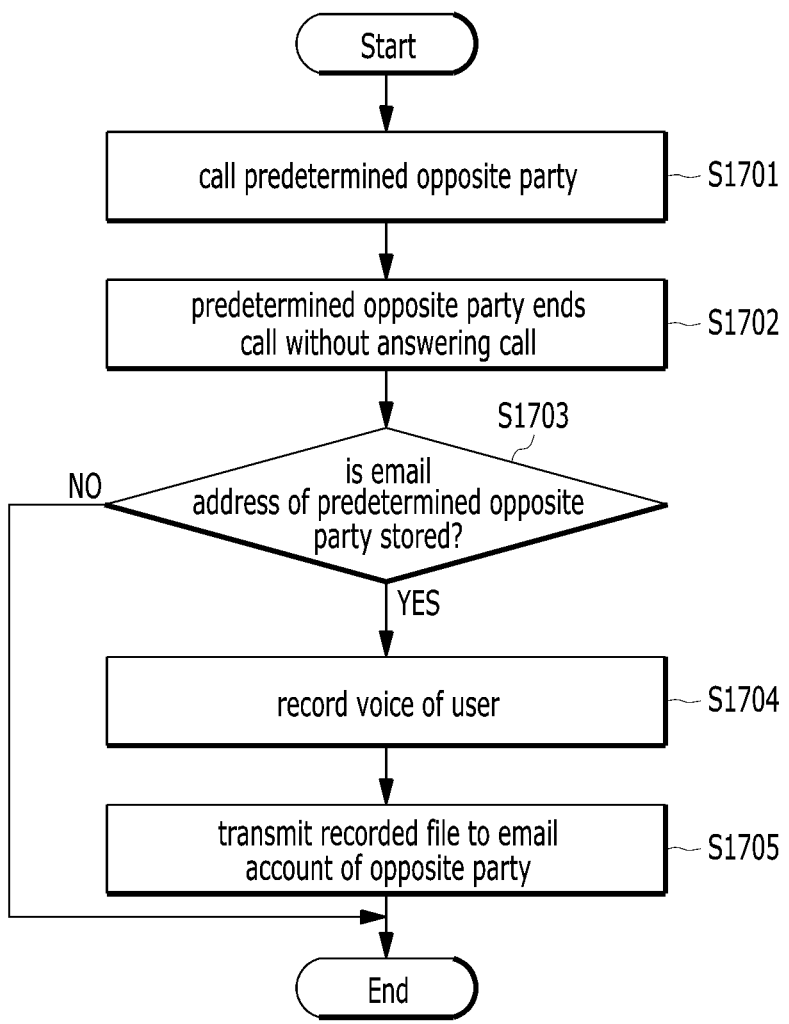
FIG. 17 is a flow chart illustrating an operation of a mobile terminal according to another example of the present invention.

FIG. 17 is a flow chart illustrating an operation of a mobile terminal 100 according to another example of the present invention.

Although a user gives a predetermined opposite party a phone call (S1701), if the predetermined opposite party does not answer the phone call (S1702), the controller 180 may determine whether an email address of the predetermined opposite party is stored in the memory 170 (S1703). If the email address of the predetermined opposite party is stored in the memory 170, the controller 180 may record a voice of the user (S1704). If voice recording is completed, the controller 180 may transmit an email, to which a recorded file is attached, to the email address of the predetermined opposite party (S1705).

At this time, the controller 180 may include a result obtained by converting the recorded voice to a text in the body text of the email. That is, the controller 180 may include the result obtained by converting the voice recorded by the user to a speech to text (STT) in the body text message of the email and attach the recorded voice to the email Therefore, the opposite party who receives the email may check information to be transferred by the user by checking either the body text message or the attached file.

In FIG. 17, the controller 180 may record the voice of the user only if the email address of the user is stored in the memory 170. Unlike the shown example of FIG. 17, the controller 180 may activate a voice recording function regardless of the fact that the email address of the user is stored in the memory 170.

Although the controller 180 may automatically transmit the email if the email address of the user is stored in the memory 170, the controller 180 cannot transmit the email until the user inputs the email address if the email address of the user is not stored in the memory 170.

The embodiment described with reference to FIG. 14 and the embodiment described with reference to FIG. 17 may be applied to the mobile terminal 100 described in the present invention.

According to one embodiment of the present invention, the aforementioned method (operation flow chart) may be implemented in a medium in which a program is recorded, as a code that can be read by a processor. Example of the medium that can be read by a processor include a ROM, a RAM, a CD-ROM, a magnetic tape, a floppy disk, and an optical data storage unit. Also, another example of the recording medium may be implemented in a type of carrier wave (for example, transmission through Internet).

The configurations and method of the aforementioned embodiments are not limited to the mobile terminal 100 described as above, and all or some of the respective embodiments may be configured selectively in combination such that various modifications can be made in the embodiments.

INDUSTRIAL APPLICABILITY

Although the present invention has been described based on the mobile terminal, the present invention may be applied to various electronic devices, which can handle emails, as well as the mobile terminal.

The invention claimed is:

1. A mobile terminal comprising:
a wireless communication unit for transmitting or receiving an email;
a display unit for displaying a draft of the email that is to be transmitted to a recipient, wherein the recipient of the email is displayed in a recipient input area of the draft of the email and body text of the email is displayed in a body text area of the draft of the email; and
a controller for automatically searching for information related to the recipient from the body text and automatically highlighting the searched information included in the body text displayed in the draft of the email in response to receiving the recipient in the recipient input area.

2. The mobile terminal according to claim 1, wherein the information included in the displayed body text and related to the recipient includes at least one of a name of the recipient, a team to which the recipient belongs, or a face of the recipient.

3. The mobile terminal according to claim 1, wherein, if a text related to the recipient is included in the body text of the email, the controller highlights the text by controlling a format of the text or a size of the text.

4. The mobile terminal according to claim 1, wherein, if an image including a face of the recipient is included in the body text of the email, the controller causes the display unit to display the face of the recipient to be identified on the image.

5. The mobile terminal according to claim 4, wherein the controller causes the display unit to display an indicator for identifying the recipient pointing at the face of the recipient.

6. The mobile terminal according to claim 1, wherein the controller:
highlights first information related to a first recipient and included in the body text displayed in the draft of the email in response to receiving the first recipient in the recipient input area; and
highlights the first information and second information, which is related to a second recipient and included in the body text displayed in the draft of the email, in response to additionally receiving the second recipient in the recipient input area displaying the first recipient.

7. The mobile terminal according to claim 6, wherein the controller causes the display unit to display each of the highlighted first and second information visually distinguishably.

8. The mobile terminal according to claim 1, wherein:
the controller highlights first information related to a first recipient and included in the body text displayed in the draft of the email in response to receiving the first recipient in the recipient input area; and
the controller highlights second information related to a second recipient and included in the body text displayed in the draft of the email in response to receiving the second recipient in the recipient input area.

9. The mobile terminal according to claim 1, wherein the email is displayed through a card type pop-up window.

10. The mobile terminal according to claim 9, wherein the controller deletes the email if a user input for dragging the pop-up window in a first direction is received, and causes the display unit to display an email drafting screen for drafting an answer to the email if a user input for dragging the pop-up window in a second direction is received.

11. The mobile terminal according to claim 1, wherein the controller causes the display unit to display a text format control button for controlling a text format input to the body text of the email.

12. The mobile terminal according to claim 11, wherein the controller applies the text format indicated by the text format control button to a text located at a point where a pointer is dragged if a user input for dragging the text format control button to the body text of the email is received.

13. The mobile terminal according to claim 1, wherein the email is a conference email for adding a new schedule and includes at least one of time information, place information, or participant information.

14. The mobile terminal according to claim 13, wherein, if a previously registered schedule exists at time indicated by the time information, the controller causes the display unit to display a pop-up window indicating that a duplicate schedule exists.

15. The mobile terminal according to claim 13, wherein at least one button for determining whether to add a new schedule at time indicated by the time information is included in the body text of the email.

16. The mobile terminal according to claim 1, further comprising a microphone, wherein the controller records a voice of a user received through the microphone if the user tries to establish a phone call connection with a predetermined opposite party, but the phone call connection fails.

17. The mobile terminal according to claim 16, wherein, when the voice recording is completed, the controller automatically causes transmission of the email, to which a file of the recorded voice is attached, to the predetermined opposite party.

18. The mobile terminal according to claim 17, wherein a text converted from the file of the recorded voice is included in the body text of the email.

19. A control method for a mobile terminal, the control method comprising:
displaying, via a display, a draft of an email that is to be transmitted to a recipient, wherein the recipient of the email is displayed in a recipient input area of the draft of the email and body text of the email is displayed in a body text area of the draft of the email; and
automatically searching for information related to the recipient from the body text and automatically highlighting the searched information included in the body text displayed in the draft of the email in response to receiving the recipient in the recipient input area.

20. The mobile terminal according to claim 1, wherein the highlighted information does not include the recipient as displayed in the recipient input area of the email.

* * * * *